United States Patent
Zhang et al.

(10) Patent No.: US 12,089,196 B2
(45) Date of Patent: Sep. 10, 2024

(54) ENHANCED PER-STREAM RECURSIVE DEMAPPING TECHNIQUES

(71) Applicant: QUALCOMM Incorporated, San Diego, CA (US)

(72) Inventors: Hong Zhang, Acton, MA (US); Jyotish Robin, Brooklyn, NY (US); Yuksel Ozan Basciftci, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/572,349

(22) Filed: Jan. 10, 2022

(65) Prior Publication Data

US 2023/0224884 A1 Jul. 13, 2023

(51) Int. Cl.
| | | |
|---|---|---|
| *H04W 72/04* | (2023.01) |
| *H04B 7/0413* | (2017.01) |
| *H04L 25/03* | (2006.01) |
| *H04L 27/38* | (2006.01) |
| *H04W 72/044* | (2023.01) |
| *H04W 72/20* | (2023.01) |

(52) U.S. Cl.
CPC ........ *H04W 72/046* (2013.01); *H04B 7/0413* (2013.01); *H04L 25/03891* (2013.01); *H04L 27/38* (2013.01); *H04W 72/20* (2023.01)

(58) Field of Classification Search
CPC ............. H04W 72/046; H04W 72/20; H04L 25/03891; H04L 27/38; H04B 7/0413
See application file for complete search history.

(56) References Cited

U.S. PATENT DOCUMENTS

| | | | | |
|---|---|---|---|---|
| 8,462,867 B2 * | 6/2013 | Van Zelst | ................. | H04L 1/06 375/267 |
| 9,883,485 B2 * | 1/2018 | Zhang | ..................... | H04L 5/001 |
| 11,431,390 B2 * | 8/2022 | Raghavan | ............ | H04B 7/0486 |
| 11,601,976 B2 * | 3/2023 | Xue | .................. | H04W 74/0808 |
| 2010/0150258 A1 * | 6/2010 | van Zelst | ............. | H04B 7/0854 375/267 |
| 2013/0287150 A1 * | 10/2013 | Jung | ................. | H04L 25/03318 375/346 |

* cited by examiner

*Primary Examiner* — Mounir Moutaouakil
(74) *Attorney, Agent, or Firm* — Guang Yu Zhang; Holland & Hart LLP

(57) ABSTRACT

Methods, systems, and devices for wireless communications are described. A wireless device may receive a transmission including a set of spatial layers. The set of spatial layers may include at least a first spatial layer and a second spatial layer subsequent to the first spatial layer. The device may determine a first number of search points of the first spatial layer based on a modulation order of the first spatial layer, and a second number of search points of the second spatial layer based on the first number of search points and a modulation order of the second spatial layer. The device may compute a quantity of distance metrics based on the first and second numbers of search points. The device may demap symbols of the received transmission based on the quantity of distance metrics. In some examples, demapping the symbols may be based on a per-stream recursive demapping process.

30 Claims, 11 Drawing Sheets

ENHANCED PER-STREAM RECURSIVE DEMAPPING TECHNIQUES

FIELD OF TECHNOLOGY

The following relates to wireless communications, including enhanced per-stream recursive demapping (PSRD) techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A signal transmitted between network nodes may be modulated by a transmitting device (e.g., a base station or UE) in accordance with a modulation and coding scheme (MCS). A receiving device (e.g., a base station or UE) may receive the transmitted signal by demodulating and demapping the transmitted signal and decoding the resultant bit values. When signals are transmitted using multiple spatial layers, demodulation of the signals at the receiving device may be associated with increased complexity.

SUMMARY

The described techniques relate to improved methods, systems, devices, and apparatuses that support enhanced per-stream recursive demapping (PSRD) techniques. Generally, the described techniques provide improved demodulation methods by increasing a number of search points and associated distance metric computations performed in a demapping process. A device (e.g., a base station, a user equipment (UE), a network node, or the like) may receive a transmission having multiple spatial layers. For instance, the transmission may include a first spatial layer, which may be referred to as a layer of interest (LOI), and one or more additional spatial layers. When processing the received signal, the device may demap symbols of the transmission based on a number of search points and a modulation order of each spatial layer of the multiple spatial layers. For instance, the device may a determine a first number of search points for the LOI based on a modulation order of the LOI. The device may also determine a second number of search points for a second spatial layer (e.g., an interference layer) that is subsequent to the LOI. The second number of search points may be determined based on the first number of search points and a modulation order of the second spatial layer. In some examples, the device may determine the modulation orders of the respective spatial layers based on a configuration message received at the device, or based on performing a blind modulation order detection (BMOD) procedure, or any combination thereof.

The device may compute a number of distance metrics based on the first number of search points and the second number of search points. For example, the device may compute one or more sets of partial distance metric computations based on the first number of search points, the second number of search points, or both. The device may use the distance metrics to demap symbols of the received transmission, e.g., as part of a PSRD process. In some cases, the first number of search points, the second number of search points, or both, may be computed in order to increase utilization of a hardware component of the device for demapping, thereby improving demodulation of a received signal and resulting in increased throughput.

A method for wireless communications at a device is described. The method may include receiving a transmission including a set of multiple spatial layers, determining a first number of search points of a first spatial layer of the set of multiple spatial layers based on a modulation order of the first spatial layer, determining a second number of search points of a second spatial layer of the set of multiple spatial layers, the second spatial layer being subsequent to the first spatial layer, where the second number of search points is based on the first number of search points and a modulation order of the second spatial layer, computing a quantity of distance metrics based on the first number of search points and the second number of search points, and demapping symbols of the received transmission based on the quantity of distance metrics.

An apparatus for wireless communications at a device is described. The apparatus may include a memory and a processor coupled to the memory. The processor may be configured to cause the apparatus to receive a transmission including a set of multiple spatial layers, determine a first number of search points of a first spatial layer of the set of multiple spatial layers based on a modulation order of the first spatial layer, determine a second number of search points of a second spatial layer of the set of multiple spatial layers, the second spatial layer being subsequent to the first spatial layer, where the second number of search points is based on the first number of search points and a modulation order of the second spatial layer, compute a quantity of distance metrics based on the first number of search points and the second number of search points, and demap symbols of the received transmission based on the quantity of distance metrics.

Another apparatus for wireless communications at a device is described. The apparatus may include means for receiving a transmission including a set of multiple spatial layers, means for determining a first number of search points of a first spatial layer of the set of multiple spatial layers based on a modulation order of the first spatial layer, means for determining a second number of search points of a second spatial layer of the set of multiple spatial layers, the second spatial layer being subsequent to the first spatial layer, where the second number of search points is based on the first number of search points and a modulation order of the second spatial layer, means for computing a quantity of distance metrics based on the first number of search points and the second number of search points, and means for demapping symbols of the received transmission based on the quantity of distance metrics.

A non-transitory computer-readable medium storing code for wireless communications at a device is described. The code may include instructions executable by a processor to receive a transmission including a set of multiple spatial layers, determine a first number of search points of a first spatial layer of the set of multiple spatial layers based on a modulation order of the first spatial layer, determine a second number of search points of a second spatial layer of the set of multiple spatial layers, the second spatial layer being subsequent to the first spatial layer, where the second number of search points is based on the first number of search points and a modulation order of the second spatial layer, compute a quantity of distance metrics based on the first number of search points and the second number of search points, and demap symbols of the received transmission based on the quantity of distance metrics.

In some examples of the method, apparatuses, and non-transitory computer-readable medium described herein, determining the second number of search points may include operations, features, means, or instructions for calculating a first minimum value from a set of values, the set of values including a first predetermined value divided by the first number of search points and a value corresponding to the modulation order of the second spatial layer, where the second number of search points may be equal to the first minimum value.

In some examples of the method, apparatuses, and non-transitory computer-readable medium described herein, the first predetermined value may be equal to 64.

In some examples of the method, apparatuses, and non-transitory computer-readable medium described herein, determining the first number of search points may include operations, features, means, or instructions for calculating a second minimum value from a set of values, the set of values including a second predetermined value and a value corresponding to the modulation order of the first spatial layer, where the first number of search points may be equal to the second minimum value.

In some examples of the method, apparatuses, and non-transitory computer-readable medium described herein, the second predetermined value may be equal to 64.

Some examples of the method, apparatuses, and non-transitory computer-readable medium described herein may further include operations, features, means, or instructions for identifying a third number of search points for a third spatial layer of the set of multiple spatial layers, the third spatial layer being subsequent to the second spatial layer and identifying a fourth number of search points for a fourth spatial layer of the set of multiple spatial layers, the fourth spatial layer being subsequent to the third spatial layer, where the quantity of distance metrics may be based on the third number of search points and the fourth number of search points.

In some examples of the method, apparatuses, and non-transitory computer-readable medium described herein, the third number of search points for the third spatial layer may be equal to one and corresponds to a single constellation point for the third spatial layer and the fourth number of search points for the fourth spatial layer equal to one and corresponds to a single constellation point for the fourth spatial layer.

Some examples of the method, apparatuses, and non-transitory computer-readable medium described herein may further include operations, features, means, or instructions for determining that the quantity of distance metrics does not satisfy a threshold quantity of distance metric computations supported by the device and modifying the second number of search points such that the quantity of distance metrics satisfies the threshold quantity of distance metric computations.

In some examples of the method, apparatuses, and non-transitory computer-readable medium described herein, the threshold quantity of distance metric computations may be based on a hardware configuration of the device.

In some examples of the method, apparatuses, and non-transitory computer-readable medium described herein, computing the quantity of distance metrics may include operations, features, means, or instructions for calculating, for each search point of the first number of search points, a first set of multiple partial distance metrics associated with the first spatial layer based on the first number of search points and the second number of search points and calculating, for each search point of the second number of search points, a second set of multiple partial distance metrics associated with the second spatial layer based on the first number of search points and the second number of search points, where the quantity of distance metrics includes the first set of multiple partial distance metrics and the second set of multiple partial distance metrics.

Some examples of the method, apparatuses, and non-transitory computer-readable medium described herein may further include operations, features, means, or instructions for identifying a modulation order of each of one or more interference layers associated with the received transmission based on one or more least square estimation metrics and determining a set of log likelihood values for the first spatial layer based on identifying the modulation order of each of the one or more interference layers.

In some examples of the method, apparatuses, and non-transitory computer-readable medium described herein, the second number of search points correspond to a set of constellation points associated with the second spatial layer for each search point of the first number of search points.

In some examples of the method, apparatuses, and non-transitory computer-readable medium described herein, the first number of search points and the second number of search points include inputs for a PSRD process and demapping the symbols of the received transmission may be based on the PSRD process.

Some examples of the method, apparatuses, and non-transitory computer-readable medium described herein may further include operations, features, means, or instructions for receiving a message indicating a configuration of the set of multiple spatial layers and an MCS for the transmission and determining one or both of the modulation order of the first spatial layer or the modulation order of the second spatial layer based on the configuration.

DETAILED DESCRIPTION

Figure 1:
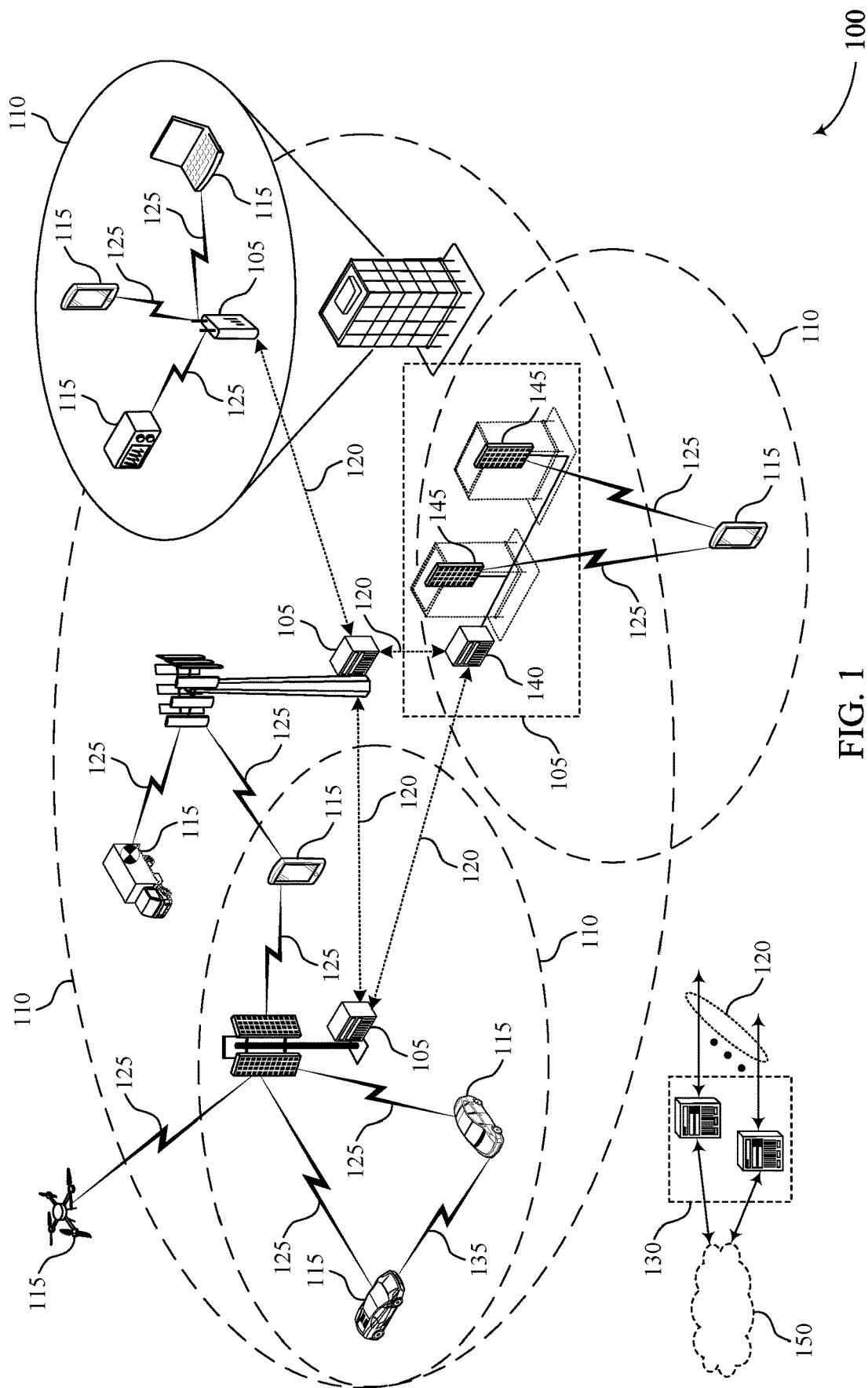
FIGS. 1 and 2 illustrate examples of wireless communications systems that support enhanced per-stream recursive demapping (PSRD) techniques in accordance with aspects of the present disclosure.

In some wireless communications systems, devices (e.g., user equipment (UE), base stations) may support multiple input multiple output (MIMO) communications, in which a device transmits and receives multiple signals using different spatial layers. For example, a device may receive a transmission having multiple spatial layers via multiple receive antennas. The device may demodulate, demap, and decode the transmission, for instance, based on a quantity of the spatial layers and a modulation order of the transmission. As the quantity of spatial layers of the transmission increases, so too does spatial diversity and data capacity of the transmission increase. MIMO communications may therefore be associated with increased reliability and throughput.

However, processing complexity, resource requirements, and power consumption may be relatively higher for MIMO operations as compared to single antenna (e.g., single spatial layer) operations. For instance, some demodulation methods may be associated with computations with relatively high complexity, which may increase in complexity as the number of spatial layers of a transmission increases. These highly complex computations may require significant processing capabilities (e.g., by hardware of a device), and may be associated with relatively high power consumption. Other demodulation methods, which may be relatively less computationally complex, may produce less accurate (and therefore less reliable) results. Additionally, in some examples, a device's computational capabilities may be constrained by hardware configurations of the device.

One demodulation method involves demapping a received signal using a per-stream recursive demapping (PSRD) procedure. Here, the device may perform distance metric computations using search points (e.g., points in a constellation) corresponding to different spatial layers of the received signal. For example, for a first spatial layer (which may be referred to as a layer of interest (LOI)), the device may use search points of the first spatial layer and a second spatial layer that is subsequent to the first spatial layer to perform a set of distance metric computations. The device may demap symbols of the received signal based on the distance metric computations.

In some examples, the device may determine a number of search points to use based on a modulation order of the first spatial layer, and may perform a quantity of distance metric computations equal to the number of search points. For instance, in some PSRD implementations, the device may select a number of search points of the first spatial layer, but may use only a single (e.g., "sliced") search point for the second spatial layer, as well as for one or more additional spatial layers. This number of search points (and corresponding quantity of distance metric computations) for the first and second spatial layers may provide sufficient performance in MIMO transmissions supporting two layers, but may not be optimal in cases where the number of spatial layers increases beyond two (e.g., for 4 or more spatial layers). That is, the device may be capable of performing more distance metric computations than the device is configured to use. For example, the device may have a hardware configuration that supports a total of 64 distance metric computations. For a four-layer MIMO transmission, the LOI may have a modulation order less than 64 (e.g., 16 quadrature amplitude modulation (QAM)) that results in a number of search points that is below a threshold capability of the hardware, resulting in an underutilization of the hardware. Thus, a quantity of distance metric computations (e.g., 16) may be relatively lower than a total limit supported by the hardware, and the capabilities of the device may not be fully utilized when demapping multi-layer signals.

The techniques described herein support improved demodulation performance without increasing hardware complexity, such that a device may optimize parameters of a demapping procedure (e.g., a PSRD procedure); multiple spatial layer transmissions may therefore be received with increased throughput and accuracy. Specifically, a device receiving a multiple spatial layer transmission may utilize an increased number of search points (e.g., as compared to conventional methods) for spatial layers subsequent to the LOI, thereby increasing the corresponding quantity of distance metric computations performed in the demapping process. For instance, the device may determine a number of search points of a second spatial layer subsequent to the LOI. The number of search points of the second spatial layer may be based on the modulation order of the second spatial layer, a number of search points of the first spatial layer, and in some examples, a predetermined value associated with a hardware configuration of the device. The device may compute a quantity of distance metrics based on the first number of search points and the second number of search points.

In some examples, the device may extend the techniques described herein to additional spatial layers of the transmission, e.g., subsequent to the second spatial layer. For instance, the device may identify a third number of search points for a third spatial layer that is subsequent to the second spatial layer, a fourth number of search points for a fourth spatial layer that is subsequent to the third spatial layer, and so forth. In some cases, the device may use a single respective search point for each spatial layer subsequent to the second spatial layer, while in other cases, the device may determine a respective number of search points for each subsequent spatial layer. For each spatial layer, the device may perform a set of partial distance metric computations based on the numbers of search points; the quantity of distance metrics computed by the device may include the sets of partial distance metric computations.

Particular aspects of the subject matter described in this disclosure may be implemented to realize one or more of the following potential advantages. Wireless devices (e.g., UEs and base stations) may utilize the techniques described herein to improve demodulation and demapping performance, which may, in turn, increase throughput in multiple spatial layer transmissions. For example, a device may increase a number of search points and corresponding distance metrics in a demapping process, which may provide improvements to reliability and throughput of wireless communications at the device without increasing interference or hardware complexity. The techniques described herein may optimize the demapping process, particularly for MIMO transmissions having more than two spatial layers and for cases where the LOI uses, for example, quadrature phase shift keying (QPSK) or 16QAM modulation schemes (e.g., modulation schemes with a modulation order that is below the capacity of the device's hardware). Additionally, the described techniques may also provide improvements in modulation order detection procedures. For instance, a device may perform blind modulation order detection (BMOD) to detect a modulation order of each spatial layer of a transmission by computing one or more least square estimation (LSE) metrics in accordance with the techniques described herein, which may enable the device to perform BMOD with relatively increased accuracy. In general, aspects of the techniques described herein provide features for improvements to spectral efficiency, higher data rates and, in some examples, may promote enhanced efficiency for high reliability and low latency operations, among other benefits.

Aspects of the disclosure are initially described in the context of wireless communications systems. Aspects of the disclosure are then described with reference to a distance computation procedure and a process flow. Aspects of the disclosure are further illustrated by and described with reference to apparatus diagrams, system diagrams, and flowcharts that relate to enhanced per-stream recursive demapping techniques.

FIG. 1 illustrates an example of a wireless communications system 100 that supports enhanced PSRD techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A transmitting device (e.g., a base station 105, a UE 115) and a receiving device (e.g., a base station 105, a UE 115) may communicate using MIMO (e.g., SU-MIMO, MU-MIMO) techniques such that signals are transmitted and received via multiple spatial layers. For example, a base station 105 may use multiple antennas to transmit a data transmission to a UE 115 (e.g., and one or more other UEs 115) using multiple spatial layers (e.g., spatial streams), and the UE 115 may use multiple antennas to receive the multiple spatial layers. A first spatial layer may carry data for the UE 115 and may be referred to as an LOI. In some cases, one or more additional spatial layers that may interfere with the LOI may be referred to as interference layers. The base station 105 may modulate each spatial layer (e.g., in accordance with a modulation and coding scheme (MCS)) and the UE 115, upon receiving the data transmission, may perform a demodulation procedure to retrieve the data included in the modulated signal.

As part of the demodulation procedure, the UE 115 may demap symbols of the transmission in accordance with the techniques described herein. For example, the UE 115 may perform an enhanced PSRD procedure by determining a first number of search points of the first spatial layer based on a modulation order of the first spatial layer. The UE 115 may determine a second number of search points of a second spatial layer subsequent to the first spatial layer, where the second number of search points may be based on the first number of search points and a modulation order of the second spatial layer. The UE 115 may demap symbols of the received data transmission by computing a set of distance metrics that are based on the first number of search points and the second number of search points. For instance, the UE 115 may use the first number of search points and the second number of search points as inputs to a demapper, such as a per-stream recursive demapper.

A demapping procedure that is based on a second number of search points for the second spatial layer in accordance with the techniques described herein may be referred to as an enhanced PSRD procedure. Enhanced PSRD procedures may provide increased throughput and reliability (e.g., as compared to PSRD procedures that use only a single search point for the second spatial layer), particularly in scenarios where signals are transmitted via more than two spatial layers. Increasing the second number of search points may correspond to increasing a quantity of distance metrics computed at the UE 115; accordingly, the UE 115 may perform the demapping procedure over a relatively larger search space, which may enable the UE 115 to process the received transmission with increased accuracy. Additionally, such enhanced PSRD procedures may improve throughput at the UE 115.

Figure 2:
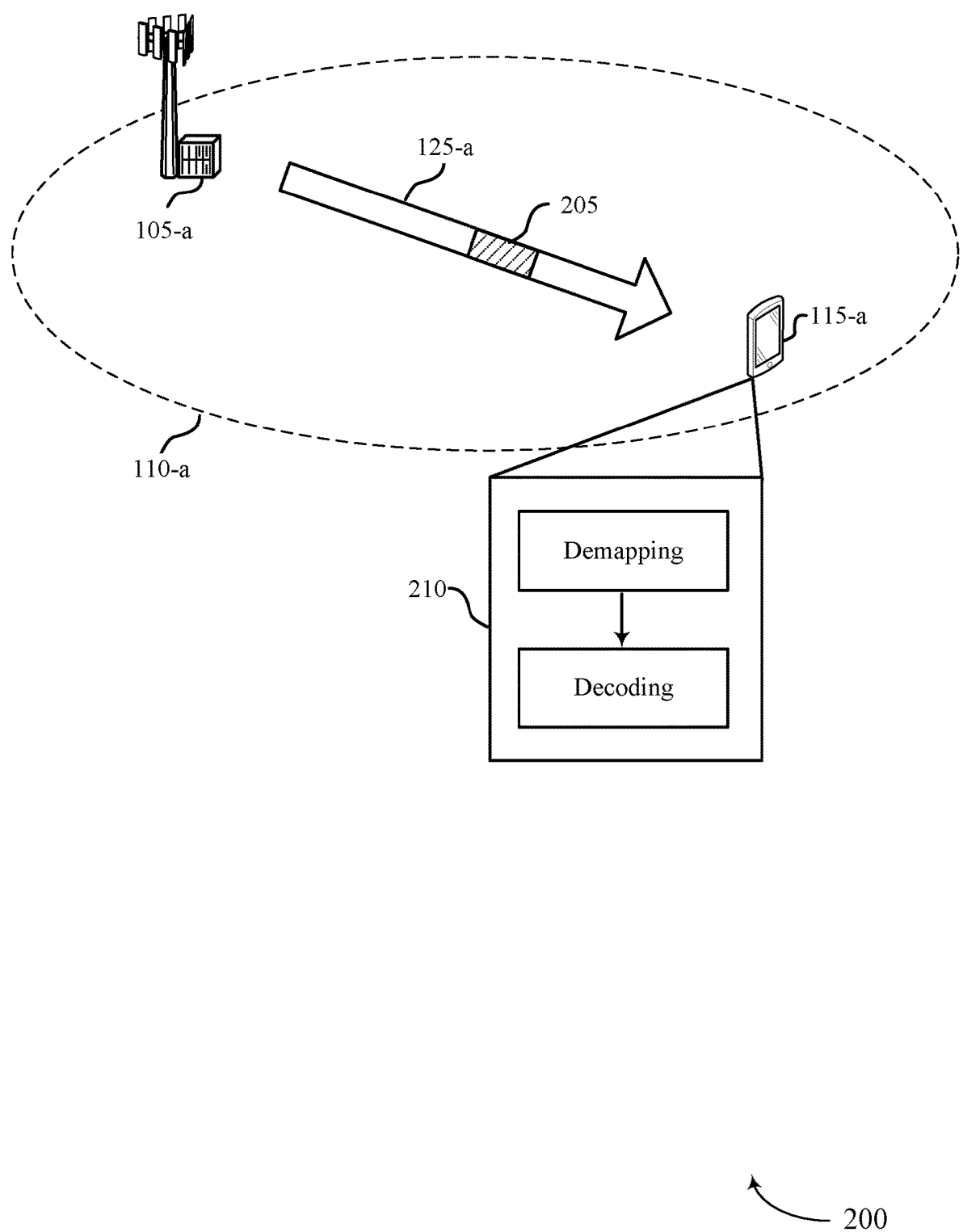

FIG. 2 illustrates an example of a wireless communications system 200 that supports enhanced PSRD techniques in accordance with aspects of the present disclosure. The wireless communications system 200 may be an example of a wireless communications system 100 as described with reference to FIG. 1. For example, the wireless communications system 200 may include a UE 115-a and a base station 105-a, which may be examples of the corresponding devices described with reference to FIG. 1. The base station 105-a and the UE 115-a may operate in a geographic coverage area 110-a and may communicate via a communication link 125-a. While FIG. 2 is described with reference to a UE 115-a and a base station 105-a, any wireless device may implement the methods and techniques described herein, and the examples shown should not be construed as limiting.

The base station 105-a may transmit, and the UE 115-a may receive, a transmission 205 via the communication link 125-a. The transmission 205 may be an example of a beamformed transmission that has multiple spatial layers. The multiple spatial layers may include at least a first spatial layer (e.g., an LOI) and one or more spatial layers subsequent to the first spatial layer. The one or more spatial layers subsequent to the first spatial layer may be interference layers, as they may provide interference to information carried via the first spatial layer.

In some examples, the base station 105-a may send transmission 205 in accordance with a spatial layer configuration and an MCS. That is, the base station 105-a may modulate the transmission 205 such that the transmission 205 corresponds to a bit sequence as defined by the MCS. In some examples, each spatial layer of the transmission 205 may be modulated according to a respective MCS. For example, the base station 105-*a* may utilize a 16QAM MCS such that base station 105-*a* may apply one of sixteen unique amplitude and phase modulations to a spatial layer of the transmission 205, where each unique amplitude and phase modulation corresponds to a unique 4-bit bit sequence. Thus, by utilizing a 16 QAM MCS, the base station 105-*a* may transmit one of sixteen unique bit sequences to the UE 115-*a* for a given spatial layer. In another example, the base station 105-*a* may utilize a 64 QAM MCS such that base station 105-*a* may apply one of sixty-four unique amplitude and phase modulations to the transmission 205, where each unique amplitude and phase modulation corresponds to a unique 6-bit bit sequence. Thus, by utilizing a 64 QAM MCS, the base station 105-*a* may transmit one of sixty-four unique bit sequences to the UE 115-*a* for a given spatial layer.

In some examples, the base station 105-*a* may modulate the transmission 205 based on a corresponding channel quality. For instance, the base station 105-*a* may select an MCS based on a carrier-to-interference-plus-noise ratio (CINR) of a channel used to transmit the transmission 205 such that the UE 115-*a* may successfully receive and process the transmission 205. In some examples, some MCSs may correspond to a CINR such that a given MCS may only be used if the CINR is at an acceptable value. A poor channel quality, for instance, may not support an MCS associated with a relatively high data rate.

The UE 115-*a* may receive the transmission 205 including the multiple spatial layers and may perform a demodulation procedure. More specifically, one or more receive antennas of the UE 115-*a* may receive a spatially-multiplexed signal (e.g., the transmission 205) from the base station 105-*a*, where the spatially-multiplexed signal may comprise a first spatial layer (e.g., a spatial stream) transmitted using a first transmit antenna of the base station 105-*a*, and one or more other spatial layer concurrently transmitted using respective transmit antennas of the base station 105-*a*. The receive antennas of the UE 115-*a* may receive some combination of the signaling transmitted by the multiple antennas of the base station 105-*a*. For example, a first receive antenna of the UE 115-*a* may receive a signal from each of the multiple spatial layers, whereas a second receive antenna of the UE 115-*a* may similarly receive a signal from each of the multiple spatial layers. Channel conditions associated with, and/or a spatial orientation of, each receive antenna of the UE 115-*a* may result in some differences in the signals received by respective receive antennas of the UE 115-*a*.

In some examples, the base station 105-*a* may modify the MCS for each of its transmit antennas, for example, based on feedback from the UE 115-*a*. As such, each spatial layer of the transmission 205 may have a same or different MCS value. The UE 115-*a* may demodulate the transmission 205 in accordance with the corresponding MCS(s) of the transmission 205. For instance, the UE 115-*a* may include components 210 that may demap and decode the transmission 205; the UE 115-*a* may perform a demapping procedure to estimate the bit sequence represented by each spatial layer, and may perform a decoding procedure to detect the data included in the received transmission 205.

To perform demapping and decoding procedures, the UE 115-*a* may determine a respective modulation order associated with each spatial layer of the transmission 205. In some examples, the base station 105-*a* may transmit a message to the UE 115-*a* that indicates a configuration of the spatial layers and the MCS such that the UE 115-*a* determines the respective modulation orders based on the message. In some cases, the UE 115-*a* may alternatively blindly detect the respective modulation orders, for example, by performing a BMOD procedure. Based on the modulation order, the UE 115-*a* may determine search points to use for computing a quantity of distance metrics, where demapping the transmission 205 is based on the quantity of distance metrics.

The UE 115-*a* may receive the transmission 205 and may determine a matrix Y as a function of transmitted data, S, where Y is defined according to Equation 1 below:

$$Y = H \cdot S + N \quad (1)$$

In Equation 1, H is the matrix representation of the channel over which the transmission 205 is received, S is the input matrix (e.g., representing the data transmitted by the base station 105-*a*), and N is a matrix representing noise (e.g., thermal noise, interference) across the channel. Y may therefore be a matrix representation of the transmission 205 received at the UE 115-*a*, and the UE 115-*a* may form an estimate of the transmitted symbols in S. Here, S may represent a baseband signal vector that is transmitted during each symbol period, and may include elements from a modulation constellation with a corresponding number of points. Each constellation point may have a defined amplitude and phase of a set of amplitudes and phases within a modulation order (e.g., QPSK, 16-QAM, 64-QAM) used for modulating symbols of the transmission 205. Each constellation point may correspond to a unique bit sequence based on the modulation order. The UE 115-*a* may determine the matrix H by performing channel estimation for the channel over which the transmission 205 is received. Matrix H may be referred to as a channel matrix that may be computed by the UE 115-*a* based on one or more channel estimation procedures. The UE 115-*a* may perform a demapping procedure to estimate the bit sequence corresponding to the matrix Y. During a demapping procedure, the UE 115-*a* may perform distance metric computations to calculate distances between the entries of matrix Y and each constellation point. A relatively smaller distance between a constellation point and an entry of the matrix Y may indicate a higher likelihood that the corresponding bit sequence is similar to that included in the transmission 205. In some examples, a number of distance metric computations may be associated with hardware at a receiving device (e.g., the UE 115-*a*), where a relatively greater number of distance metric computations may correspond to relatively increased hardware capabilities to perform the distance computations.

Algorithms for the detection of MIMO signals may have varying accuracy and complexity. For example, linear MIMO detection algorithms (e.g., zero-forcing (ZF), minimum mean squared error (MMSE)) may provide relatively reduced complexity, but may likewise have reduced accuracy (e.g., as compared to near-maximum likelihood (ML)-type algorithms). For example, some demapping procedures (e.g., ML demapping procedures) may require a receiver, such as the UE 115-*a*, to perform relatively complex calculations on every RE of the transmission 205. As the number of REs (and the size of utilized bandwidths) included in a transmission increases (as is the case in mmW systems), the computational cost of performing some demapping procedures, and the associated silicon die size, may increase, resulting in high power usage at the UE 115-*a*. Other types of demapping techniques may be relatively less computationally complex, such as MMSE demapping, ZF demapping, or the like, but may result in relatively worse (e.g., less accurate) decoding performance and accuracy, as compared to decoding techniques that are a function of ML-based demapping. Other MIMO detection algorithms, such as tree-search may have varying computational complexity, but may be similarly restricted by a tradeoff between accuracy and complexity. By contrast, PSRD techniques may achieve near-ML performance while having a computational complexity that is proportional to a product of the number of spatial layers and a constellation size. Put another way, PSRD techniques may provide for relatively high MIMO detection accuracy (e.g., compared to MMSE algorithms), while maintaining relatively low computational complexity (e.g., compared to ML algorithms).

Various aspects of the present disclosure relate to PSRD demapping techniques. The UE 115-a may perform a PSRD procedure to achieve improved accuracy in demapping while avoiding relatively high power consumption. During a PSRD procedure, the UE 115-a may perform distance metric computations to calculate distances between the entries of matrix Y and each constellation point of the set of constellation points. The UE 115-a may estimate the bit sequence based on the distance metric computations, which may enable the UE 115-a to perform fewer overall computations, and relatively less complex computations, than an ML demapping procedure while achieving near-ML performance. A shorter distance between a constellation point and an entry of matrix Y may indicate a relatively higher likelihood that the corresponding bit sequence is similar to that included in the transmission 205.

The UE 115-a may input the calculated distances to a decoder, which may determine a logarithmic-likelihood ratio (LLR) of the received modulated signal based on the calculated distances. The decoder may determine a bit sequence from the LLR(s) and perform error detection on the bit sequence (e.g., a cyclic redundancy check (CRC)) to determine if the bit sequence passed error detection.

Techniques described herein support expanding a search space for the distance metric computations for a given spatial layer in a demapping procedure. For instance, in a PSRD procedure, the UE 115-a may identify the matrix Y that corresponds to a LOI (e.g., a spatial layer of interest) of the transmission 205. The UE 115-a may determine a set of constellation points, which may also be referred to as search points, for the LOI, and may "slice" or otherwise select a single constellation point (i.e., search point) for a spatial layer subsequent to the LOI. The UE 115-a may perform the distance metric computations for the LOI (e.g., to estimate bit sequences of the LOI) using the set of search points for the LOI and the search point for the spatial layer subsequent to the LOI. The UE 115-a may expand the search space by increasing the quantity of search points such that the UE 115-a may compute a greater quantity of distance metrics, e.g., between a vector representation of the LOI (e.g., the matrix Y) and each search point.

According to the present disclosure, the UE 115-a may perform an enhanced PSRD procedure such that the UE 115-a determines a grid of multiple search points for the spatial layer subsequent to the LOI. Put another way, in a PSRD procedure, the single search point for the spatial layer subsequent to the LOI may correspond to a minimum L2 norm (e.g., a search point having a shortest distance to the vector representation of the LOI). In an enhanced PSRD procedure, the UE 115-a may determine a set of search points corresponding to a set of minimum L2 norms. The UE 115-a may therefore estimate a bit sequence for the LOI based on the expanded search space that includes the set of search points for the LOI and the set of search points for the spatial layer subsequent to the LOI. In some examples, expanding the search space may enable the UE 115-a to calculate an increased quantity of distance metrics compared to conventional PSRD procedures (e.g., to fully utilize a hardware capability of the UE 115-a). As the quantity of search points increases, the search space increases, and the UE 115-a may therefore estimate bit sequences and demap a transmission with increased accuracy, which may in turn improve throughput at the UE 115-a.

For example, the UE 115-a may determine a first set of search points for the first spatial layer (e.g., the LOI) of the transmission 205 and a second set of search points for a second spatial layer (e.g., an interference layer) subsequent to the first spatial layer. In some examples, the UE 115-a may determine a first number of search points M to include in the first set of search points based on a value corresponding to the modulation order of the first spatial layer, as in Equation 2 below:

$$M = \min(X, \text{Modulation order of LOI}) \quad (2)$$

where X is a predetermined value that corresponds to a hardware configuration of the UE 115-a. For example, the UE 115-a may have a hardware configuration that supports a threshold (e.g., maximum) of 64 distance computations such that X is equal to 64. Based on the capabilities of the UE 115-a, however, the value of X may be different (e.g., more or less than 64). The UE 115-a may determine the value corresponding to the modulation order of the first spatial layer based on determining the modulation order of the first spatial layer (e.g., via a received configuration message, a BMOD procedure, etc.); the modulation order may be equal to $2^n$, where n is a quantity of bits per resource element of a transmission. For instance, if the UE 115-a determines that the first spatial layer is associated with 16QAM, the value corresponding to the modulation order of the first spatial layer may be equal to 16. That is, 16QAM supports 4 bits per resource element such that $2^4 = 16$.

Additionally, the UE 115-a may determine a second number of search points N to include in the second set of search points based on the predetermined value X, the first number of search points M, and a value corresponding to the modulation order of the second spatial layer, as in Equation 3 below:

$$N = \min\left(\frac{X}{M}, \text{Modulation order of second spatial layer}\right) \quad (3)$$

In some examples, N may correspond to a set of constellation points associated with the second spatial layer for each search point of the first set of search points.

The UE 115-a may compute a quantity of distance metrics based on the first set of search points and the second set of search points. In some examples, the quantity of distance metrics may include one or more sets of partial distance metrics, where each set of partial distance metrics may be associated with a spatial layer. For instance, for each search point of the first set of search points, the UE 115-a may compute a first set of partial distance metrics associated with the first spatial layer based on the first set of search points and the second set of search points, and may compute a second set of partial distance metrics associated with the second spatial layer based on the first set of search points and the second set of search points. The number of partial distance metrics computed in each set may be based on the first number of search points (M), the second number of search points (N), or both (MN), e.g., as described in greater detail with reference to FIG. 3.

In some cases, the UE 115-a may determine search points to use in the demapping procedure for each spatial layer subsequent to the second spatial layer. In some examples, the UE 115-a may use a single respective search point for each of the subsequent spatial layers; in other examples, the UE 115-a may determine a set of respective search points for each of the subsequent spatial layers (e.g., based on a modulation order of each spatial layer, a number of search points of a preceding spatial layer, etc.). The number of search points used for each respective spatial layer in the demapping procedure may be represented by (M, N, . . . , Z).

As a specific example, the transmission 205 may include four spatial layers. The UE 115-a may have a hardware configuration such that the predetermined value X is equal to 64. A first spatial layer, considered the LOI, may be modulated according to 16QAM such that the value corresponding to the modulation order of the LOI may be equal to 16. A second spatial layer subsequent to the LOI (i.e., "below" the LOI) may be modulated according to 64QAM such that the value corresponding to the modulation order of the second spatial layer may be equal to 64. A third spatial layer subsequent to the second spatial layer, and a fourth spatial layer subsequent to the third spatial layer, may each also be modulated according to 64QAM. The UE 115-a may determine, based on Equation 2 and Equation 3, respectively, to use M=16 search points for the first set of search points and N=4 search points for the second set of search points. Additionally, the UE 115-a may select a single search point for the third spatial layer and a single search point for the fourth spatial layer. The number of search points for each spatial layer in this example may be represented by (16, 4, 1, 1). The UE 115-a may compute a quantity of distance metrics based on the search points (16, 4, 1, 1).

By determining the value of N in accordance with Equation 3 (i.e., based on M and X), and thereby increasing the number of search points in the second set of search points as compared to conventional PSRD techniques, the UE 115-a may perform a demapping procedure (e.g., an enhanced PSRD procedure) with relatively higher accuracy. The techniques described herein may be associated with a higher overall throughput in comparison to a demapping procedure that uses a single search point for the second set of search points. For a given MCS and corresponding CINR, a transmission that is demapped using an enhanced PSRD procedure may be associated with a relatively higher throughput than a transmission that is demapped using a conventional PSRD procedure.

Table 1 illustrates a comparison between a PSRD procedure and an enhanced PSRD procedure at a device (e.g., the UE 115-a) having a hardware configuration such that X is equal to 64 and for a transmission (e.g., transmission 205) having four spatial layers. In the PSRD procedure, the UE 115-a may compute a quantity of distance metrics for each layer based on the first number of search points M. For the first spatial layer (e.g., Layer 3, the LOI), the UE 115-a may compute a same quantity of distance metrics (e.g., based on M) in both the PSRD procedure and the enhanced PSRD procedure. However, for layers other than Layer 3, the UE 115-a may compute the quantity of distance metrics based on both M and N in the enhanced PSRD procedure. Accordingly, in the enhanced PSRD procedure, the UE 115-a may compute a greater quantity of distance metrics per layer than in the PSRD procedure. Additionally, the UE 115-a may compute a greater total quantity of distance metrics in the enhanced PSRD procedure than in the PSRD procedure. Table 1 includes a percent increase z in the quantity of distance metrics performed per layer and the total quantity of distance metrics for the enhanced PSRD procedure.

TABLE 1

| Layer | Number of Layer-Level Distance Metrics Computed | | Percent Increase z |
|---|---|---|---|
| | PSRD | Enhanced PSRD | |
| Layer 3 (LOI) | min (64, M) | min (64, M) | 0 |
| Layer 2 | min (64, M) | min (64, MN) | If $M > 64, z = 0$<br>If $MN > 64, z = \frac{64 - M}{M}(100)$<br>If $MN < 64, z = (N - 1)(100)$ |
| Layer 1 | min (64, M) | min (64, MN) | If $M > 64, z = 0$<br>If $MN > 64, z = \frac{64 - M}{M}(100)$<br>If $MN < 64, z = (N - 1)(100)$ |
| Layer 0 | min (64, M) | min (64, MN) | If $M > 64, z = 0$<br>If $MN > 64, z = \frac{64 - M}{M}(100)$<br>If $MN < 64, z = (N - 1)(100)$ |
| Total | 4 min (64, M) | min (64, M) + 3 min (64, MN) | $\frac{\min(64, MN) - \min(64, M)}{\min(64, M)}(75)$ |

As illustrated in Table 1, enhanced PSRD procedures provide increased quantities of distance metrics, and therefore improved demapping performance (e.g., when M is less than 64). Put another way, enhanced PSRD procedures may enable the UE 115-a to optimize demapping when the LOI has a modulation order that is less than a threshold hardware capability, thereby avoiding under-utilization of hardware resources while increasing throughput. Additionally, the techniques described herein may provide significant improvements when the number of spatial layers of a transmission is greater than two.

The techniques described herein may additionally improve performance in BMOD procedures at a device, such as the UE 115-a. For instance, the UE 115-a may perform a BMOD procedure to detect the modulation order for each interference layer of the spatial layers of the transmission 205. Here, the UE 115-a may calculate one or more LSE metrics to detect or otherwise identify each modulation order, and may determine a set of log-likelihood values (e.g., log-likelihood ratios) for the first spatial layer based on the detected modulation order(s). As the number of search points in the interference layers are increased in enhanced PSRD, the BMOD procedure may be performed with increased accuracy. That is, the UE 115-a may be more likely to correctly identify the modulation order of an interference layer using BMOD in accordance with the techniques described herein. Additionally, performing an enhanced PSRD procedure using modulation orders identified via a BMOD procedure may likewise be associated with increased accuracy.

Figure 3:
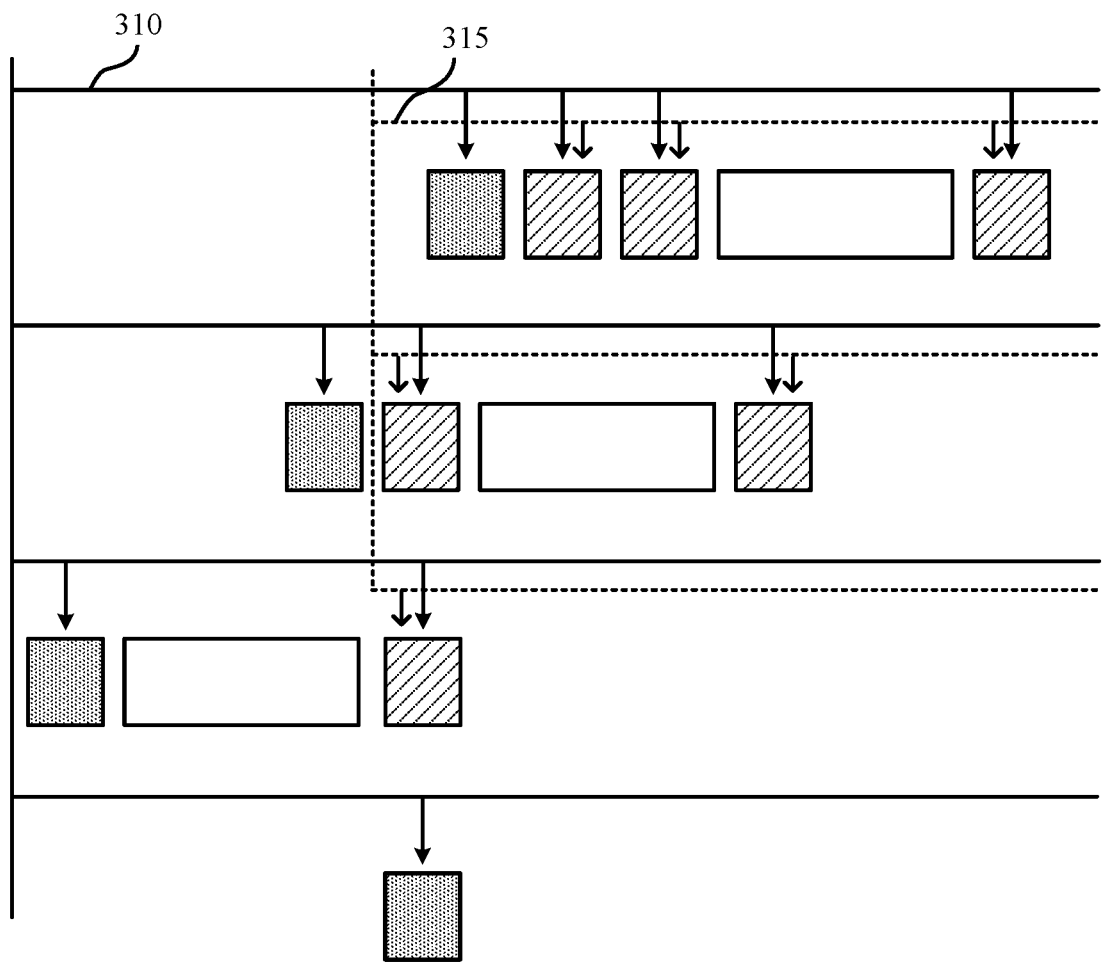
FIG. 3 illustrates an example of a distance computation procedure that supports enhanced PSRD techniques in accordance with aspects of the present disclosure.

FIG. 3 illustrates an example of a distance computation procedure 300 that supports enhanced PSRD techniques in accordance with aspects of the present disclosure. In some examples, distance computation procedure 300 may implement or be implemented by aspects of wireless communications systems 100 and 200. For example, distance computation procedure 300 may be implemented at a receiving device, such as a base station 105 or a UE 115 as described with reference to FIGS. 1 and 2. The distance computation procedure may in some examples be performed by one or more hardware components of the receiving device. Distance computation procedure 300 may be used by the receiving device as part of a demapping procedure, such as an enhanced PSRD procedure.

As described above with reference to FIG. 2, a device may receive a beamformed transmission having multiple spatial layers. The device may demap the transmission in accordance with the techniques described herein. For example, the device may determine a first number of search points of a first spatial layer of the transmission based on a modulation order of the first spatial layer. The device may determine a second number of search points of a second spatial layer subsequent to the first spatial layer based on the first number of search points and a modulation order of the second spatial layer. The device may compute a quantity of distance metrics based on the first number of search points and the second number of search points.

The device may include a set of distance blocks 305 used to compute the distance metrics for each spatial layer. For example, the device may calculate a first set of partial distance metrics and a second set of partial distance metrics, where the quantity of distance metrics includes the first set and the second set of partial distance metrics. Each distance block 305 may perform a partial distance metric computation such that the quantity of distance metrics involves all ten of the distance blocks 305. The number of distance blocks 305 may be determined by a hardware configuration of the device. Thus, a total quantity of distance metric computations supported by a device (e.g., supported by a hardware configuration of a device) may be determined by the quantity of distance blocks 305 included in the device. In the example of FIG. 3, the device may be capable of 64 distance metric computations and each distance metric computation may utilize ten distance blocks 305.

For example, to demap a transmission having four spatial layers, the device may determine a number of search points for each layer. With reference to FIG. 2, the device may perform a PSRD procedure based on (M, N, 1, 1). The device may compute the quantity of distance metrics by calculating, for each search point of the first number of search points M, a first set of partial distance metrics associated with a first spatial layer of the transmission and a second set of partial distance metrics associated with a second spatial layer subsequent to the first spatial layer. The first set of partial distance metrics and the second set of partial distance metrics may each be based on the first number of search points M and the second number of search points N.

As illustrated in FIG. 3, the distance blocks 305-$a$ may be associated with the first set of partial distance metrics, represented by input arrows 310, and the distance blocks 305-$b$ may be associated with the second set of partial distance metrics, represented by input arrows 315. For example, for each search point in M, each distance block 305-$a$ may compute a partial distance metric between the respective search points and each other search point in M. The device may therefore perform a total of 4M partial distance metric computations in the first set. For each search point in M, each distance block 305-$b$ may compute a partial distance metric between the respective search point and each other search point in M, as well as between the respective search point and each search point in N. Accordingly, the device may perform a total of 6MN partial distance metric computations in the second set. The total quantity of distance metrics computed may be equal to 4M+6MN.

As a specific example, the first spatial layer and the second spatial layer may both be modulated according to 16QAM. The device may perform enhanced PSRD according to (16, 4, 1, 1) such that the device may perform a total quantity of 448 distance metric computations to demap the received transmission. However, in some examples, the device may be capable of supporting a number of distance metric computations that is greater than 4M+6MN. For instance, the device may support 640 distance metric computations. To optimize the PSRD procedure, and to avoid underutilization of hardware capabilities at the device, the device may modify the second number of search points N to increase the quantity of distance metrics without exceeding the capability of the device.

For example, the device may be configured with a threshold quantity of distance metric computations supported by the device (e.g., based on a hardware configuration of the device). The device may determine that the total quantity of distance metrics (e.g., 4M+6MN) is less than the threshold quantity of distance metric computations. As a result, the device may adjust the value of N such that the quantity of distance metrics satisfies the threshold quantity of distance metric computations. For instance, the device may select a maximum value for N that satisfies the inequality of Equation 4 below:

$$4M+6MN \leq \text{Threshold} \qquad (4)$$

For a threshold of 640 distance metric computations when M is equal to 16, the device may select N to be equal to 6. That is, according to the techniques described herein, the device may increase the number of search points for the second spatial layer to exceed the minimum value as calculated by Equation 3. Accordingly, the device may in turn further improve demapping performance and overall throughput.

Figure 4:
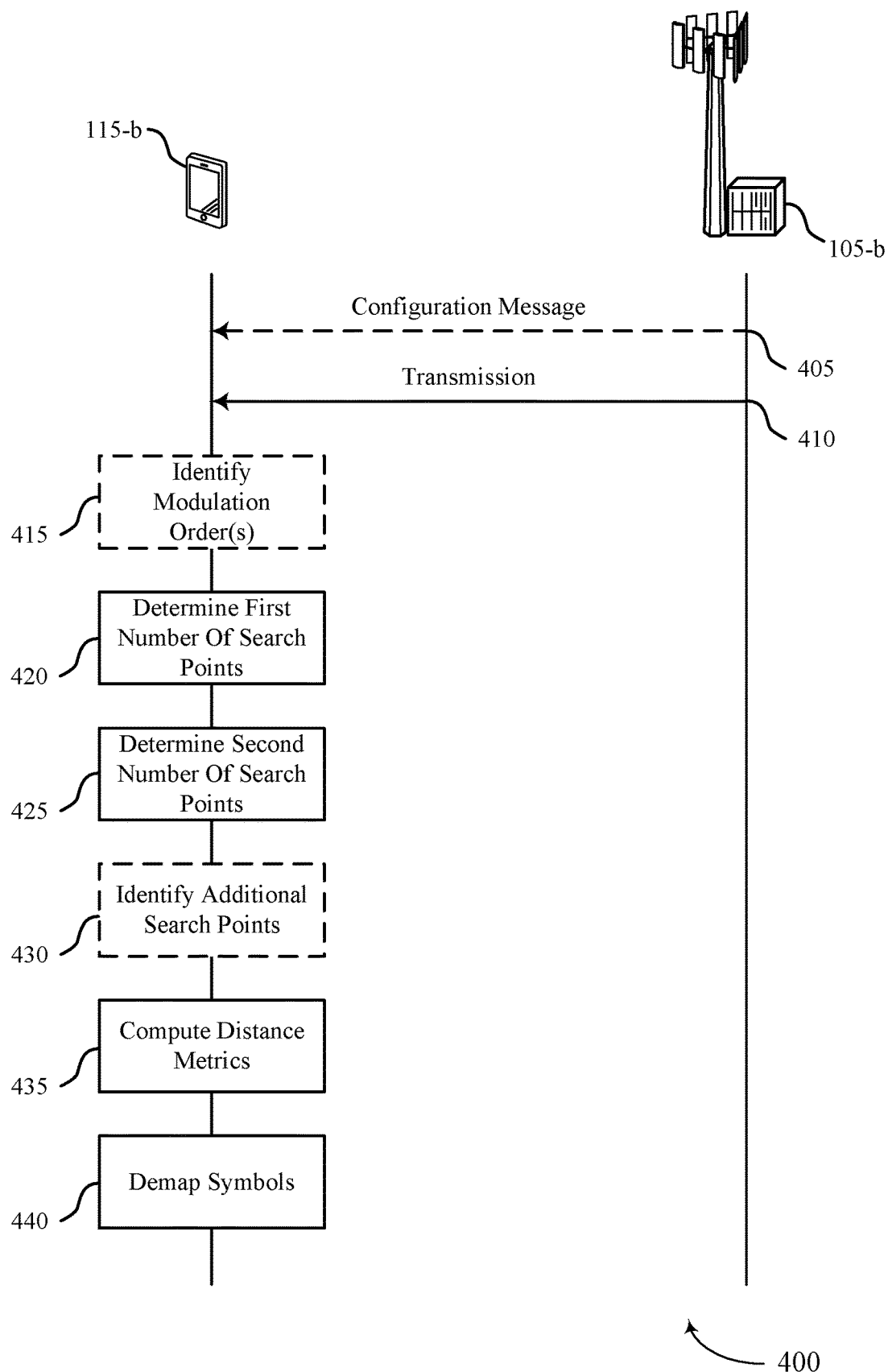
FIG. 4 illustrates an example of a process flow that supports enhanced PSRD techniques in accordance with aspects of the present disclosure.

FIG. 4 illustrates an example of a process flow 400 that supports enhanced PSRD techniques in accordance with aspects of the present disclosure. In some examples, process flow 400 may implement aspects of wireless communications systems 100 and 200. For example, process flow 400 includes a UE 115-$b$ and a base station 105-$b$, which may be examples of the corresponding devices described herein. Additionally, the operations in process flow 400 performed by the UE 115-$b$ and the base station 105-$b$ may be respectively performed by a UE 115, a base station 105, or another wireless device, and the example shown should not be construed as limiting. For example, the operations in process flow performed by the base station 105-$b$ may be performed by any transmitting device, and the operations in process flow performed by the UE 115-$b$ may be performed by any receiving device.

At 405, the base station 105-$b$ may optionally transmit, and the UE 115-$b$ may receive, a configuration message indicating a configuration of a set of spatial layers and an MCS for a transmission to be transmitted, e.g., at 410.

At 410, the base station 105-$b$ may transmit, and the UE 115-$b$ may receive, the transmission, where the transmission includes a set of spatial layers. The set of spatial layers may include at least a first spatial layer (i.e., an LOI) and a second spatial layer subsequent to the first spatial layer. In some examples, the set of spatial layers may further include a third spatial layer subsequent to the second spatial layer, and a fourth spatial layer subsequent to the third spatial layer, or any number of additional spatial layers. In some examples, the spatial layers other than the first spatial layer may be considered interference layers. In cases where the base station 105-$b$ transmits a configuration message at 405, the base station 105-$b$ may transmit the transmission in accordance with the configuration message.

At 415, the UE 115-b may optionally identify a respective modulation order for each spatial layer of the set of spatial layers. For instance, the UE 115-b may identify a first modulation order of the first spatial layer, a second modulation order of the second spatial layer, and so forth. In some cases, the UE 115-b may identify the respective modulation orders based on the configuration message received at 405 (e.g., based on the MCS and configuration indicated in the configuration message).

In some examples, the UE 115-b may identify a respective modulation order for each spatial layer different from the first spatial layer (i.e., for each interference layer) of the transmission based on one or more LSE metrics. For instance, the UE 115-b may perform a BMOD procedure to identify a respective modulation order of each interference layer. Additionally, the UE 115-b may determine a set of log-likelihood value for the first spatial layer based on identifying the modulation orders of the interference layers.

At 420, the UE 115-b may determine a first number of search points (e.g., M search points) of the first spatial layer, e.g., based on the modulation order of the first spatial layer. In some examples, the UE 115-b may determine the first number of search points based on calculating a first minimum value from a set of values, as in Equation 2 described with reference to FIG. 2. For instance, the UE 115-b may identify or otherwise determine that the set of values includes a first predetermined value (e.g., based on a hardware configuration of the UE 115-b) and a value corresponding to the modulation order of the first spatial layer. As an example, if the modulation order of the first spatial layer is 16QAM, the corresponding value may be 16; if the modulation order of the first spatial layer is 64QPSK, the corresponding value may be 64, and so forth. In some cases, the first predetermined value may be equal to 64. The UE 115-b may calculate the first minimum value from the set of values such that the first number of search points is equal to the first minimum value.

At 425, the UE 115-b may determine a second number of search points (e.g., N search points) of the second spatial layer, e.g., based on the modulation order of the second spatial layer and the first number of search points. In some examples, the UE 115-b may determine the second number of search points based on calculating a second minimum value from a set of values, as in Equation 3 described with reference to FIG. 2. For instance, the UE 115-b may identify or otherwise determine that the set of values includes a second predetermined value (e.g., based on a hardware configuration of the UE 115-b) divided by the first number of search points (i.e., M), and a value corresponding to the modulation order of the second spatial layer. As an example, if the modulation order of the second spatial layer is 16QAM, the corresponding value may be 16; if the modulation order of the second spatial layer is 64QPSK, the corresponding value may be 64, and so forth. In some cases, the second predetermined value may be equal to 64. The UE 115-b may calculate the second minimum value from the set of values such that the second number of search points is equal to the second minimum value. In some examples, the second number of search points may correspond to a set of constellation points associated with the second spatial layer for each search point of the first number of search points.

At 430, the UE 115-b may optionally identify additional respective numbers of search points for each additional spatial layer in the set of spatial layers of the transmission. For instance, if the set of spatial layers includes a third spatial layer subsequent to the second spatial layer, the UE 115-b may identify a third number of search points for the third spatial layer. In some examples, the third number of search points may be based on a modulation order of the second spatial layer, the second number of search points, or the like. In some cases, the third number of search points for the third spatial layer is equal to one (1) and corresponds to a single constellation point for the third spatial layer. If the set of spatial layers further includes a fourth spatial layer subsequent to the third spatial layer, the UE 115-b may identify a fourth number of search points for the fourth spatial layer (e.g., based on a modulation order of the third spatial layer, the third number of search points, or the like). In some cases, the fourth number of search points for the fourth spatial layer is equal to one (1) and corresponds to a single constellation point for the fourth spatial layer.

At 435, the UE 115-b may compute a quantity of distance metrics based on at least the first number of search points and the second number of search points, for instance, as described in greater detail with reference to FIG. 3. The quantity of distance metrics may include multiple partial distance metrics. For instance, the UE 115-b may calculate, for each search point of the first number of search points, a first set of partial distance metrics associated with the first spatial layer. The first set of partial distance metrics may be based on the first number of search points and the second number of search points. The UE 115-b may also calculate, for each search point of the first number of search points, a second set of partial distance metrics associated with the second spatial layer. The second set of partial distance metrics may be based on the first number of search points and the second number of search points. The quantity of distance metrics may include the first set of partial distance metrics and the second set of partial distance metrics.

In some examples, the UE 115-b may compute the quantity of distance metrics based on the additional numbers of search points for each additional spatial layer in the set of spatial layers. For instance, if the UE 115-b identified, at 430, a third number of search points and a fourth number of search points, the UE 115-b may compute the quantity of distance metrics based on the first number of search points, the second number of search points, the third number of search points, and the fourth number of search points.

In some cases, the UE 115-b may determine that the quantity of distance metrics fails to satisfy a threshold quantity of distance metric computations supported by the UE 115-b (e.g., as described with reference to FIG. 3). For instance, the quantity of distance metrics performed by the UE 115-b may be dependent on the first number of search points and the second number of search points, which in turn are determined using the first minimum value and the second minimum value. The threshold quantity of distance metric computations may be based on a hardware configuration of the UE 115-b. However, the UE 115-b may be capable of supporting a greater number of distance metrics than indicated by the first and second minimum values (e.g., the hardware configuration of the UE 115-b may be capable of calculating a greater number of distance metrics). In such cases, the UE 115-b may modify the second number of search points such that the quantity of distance metrics satisfies the threshold quantity of distance metric computations.

At 440, the UE 115-b may demap symbols of the transmission received at 410 based on the quantity of distance metrics computed at 435. For example, the UE 115-b may input the first number of search points and the second number of search points to a PSRD process.

Figure 5:
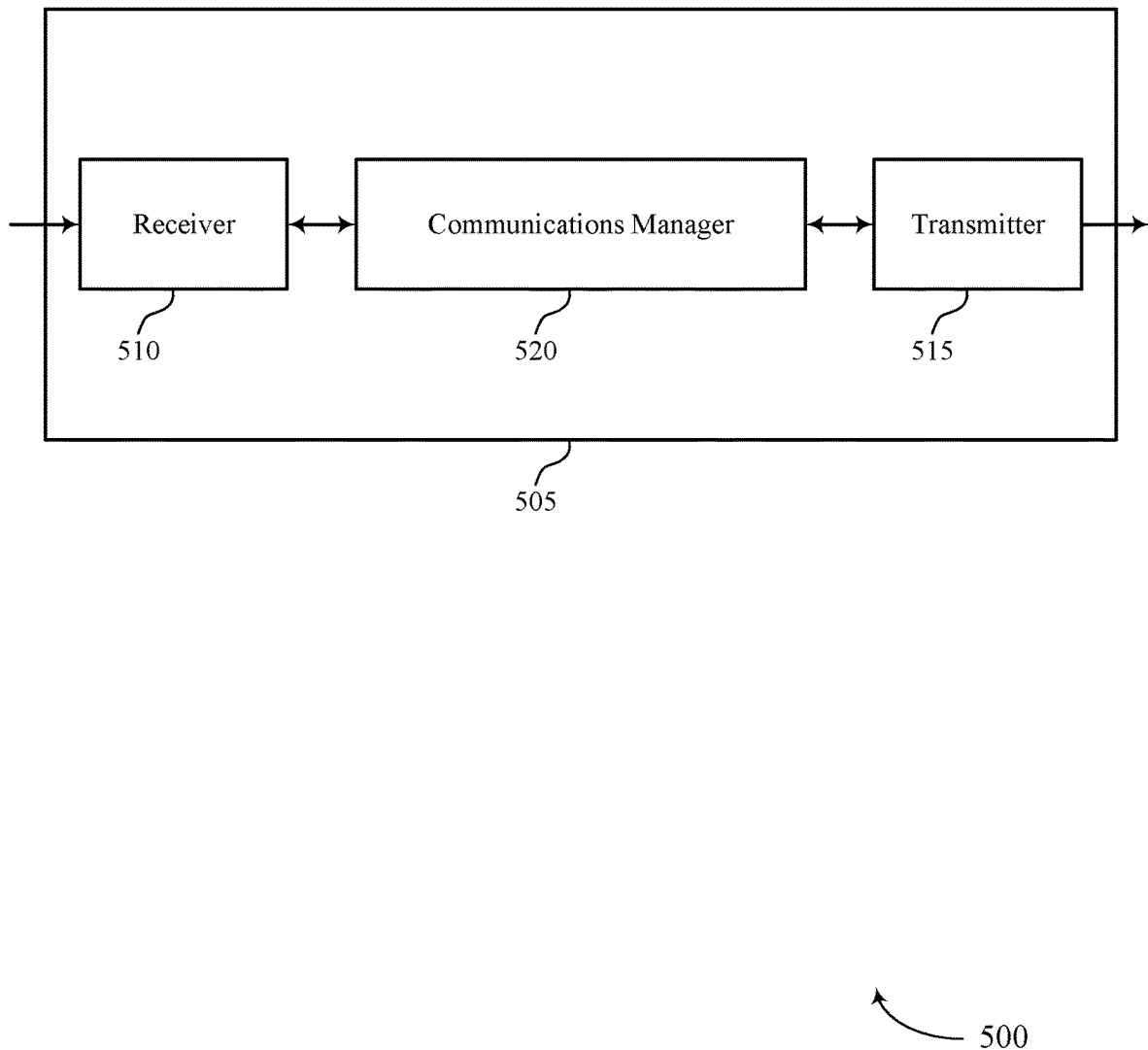
FIGS. 5 and 6 show block diagrams of devices that support enhanced PSRD techniques in accordance with aspects of the present disclosure.

FIG. 5 shows a block diagram 500 of a device 505 that supports enhanced PSRD techniques in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to enhanced PSRD techniques). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhanced PSRD techniques). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhanced PSRD techniques as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a device in accordance with examples as disclosed herein. For example, the communications manager 520 may be configured as or otherwise support a means for receiving a transmission including a set of multiple spatial layers. The communications manager 520 may be configured as or otherwise support a means for determining a first number of search points of a first spatial layer of the set of multiple spatial layers based on a modulation order of the first spatial layer. The communications manager 520 may be configured as or otherwise support a means for determining a second number of search points of a second spatial layer of the set of multiple spatial layers, the second spatial layer being subsequent to the first spatial layer, where the number of second search points is based on the first number of search points and a modulation order of the second spatial layer. The communications manager 520 may be configured as or otherwise support a means for computing a quantity of distance metrics based on the first number of search points and the second number of search points. The communications manager 520 may be configured as or otherwise support a means for demapping symbols of the received transmission based on the quantity of distance metrics.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved signal processing without increasing hardware complexity. For instance, the device 505 may demap a received multi-layer transmission based on a relatively increased number of search points. As the number of search points increases, the number of corresponding distance metrics computed also increases. Accordingly, the device 505 may process the received transmission with increased efficiency and improved accuracy.

Figure 6:
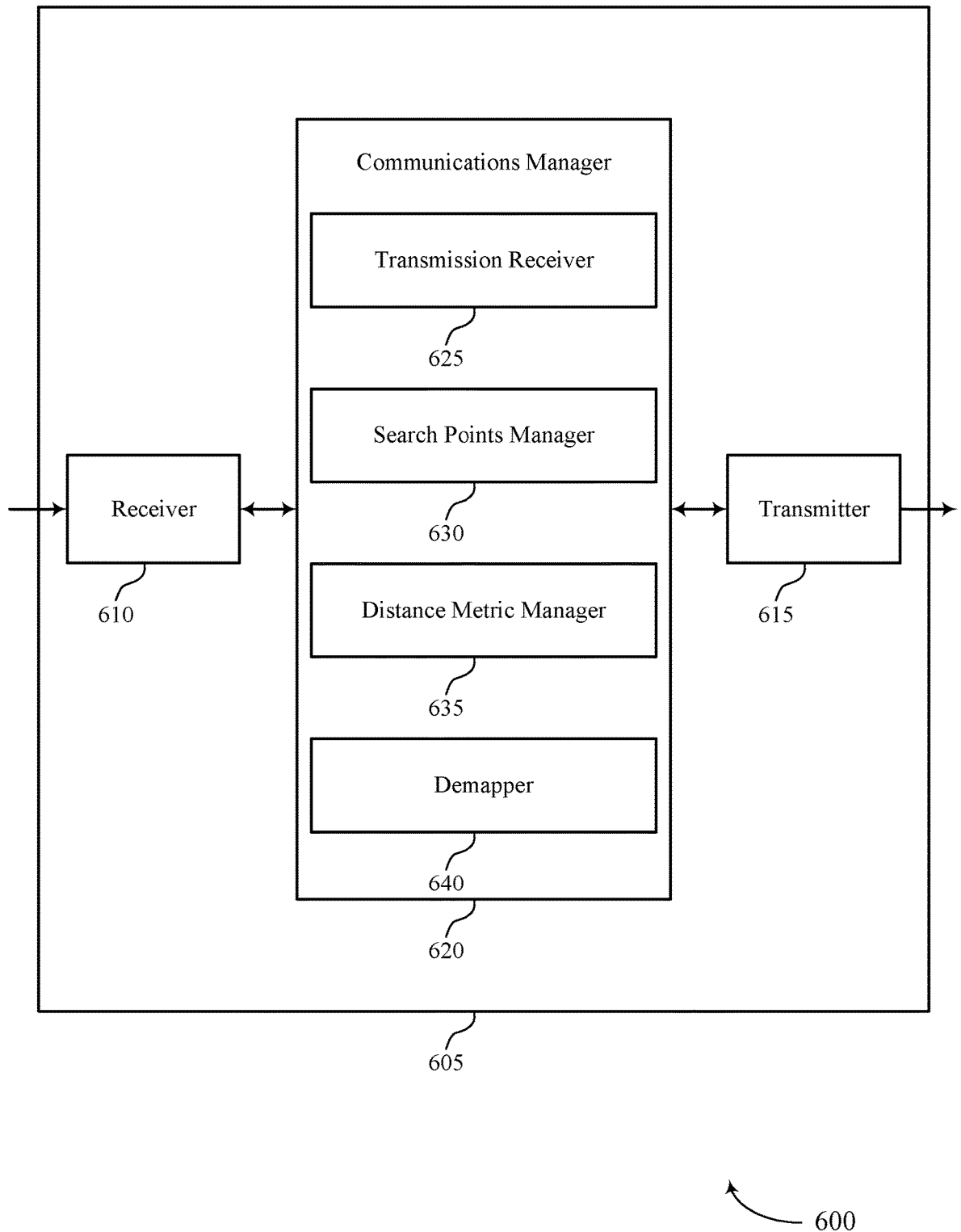

FIG. 6 shows a block diagram 600 of a device 605 that supports enhanced PSRD techniques in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced PSRD techniques). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced PSRD techniques). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhanced PSRD techniques as described herein. For example, the communications manager 620 may include a transmission receiver 625, a search points manager 630, a distance metric manager 635, a demapper 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a device in accordance with examples as disclosed herein. The transmission receiver 625 may be configured as or otherwise support a means for receiving a transmission including a set of multiple spatial layers. The search points manager 630 may be configured as or otherwise support a means for determining a first number of search points of a first spatial layer of the set of multiple spatial layers based on a modulation order of the first spatial layer. The search points manager 630 may be configured as or otherwise support a means for determining a second number of search points of a second spatial layer of the set of multiple spatial layers, the second spatial layer being subsequent to the first spatial layer, where the second number of search points is based on the first number of search points and a modulation order of the second spatial layer. The distance metric manager 635 may be configured as or otherwise support a means for computing a quantity of distance metrics based on the first number of search points and the second number of search points. The demapper 640 may be configured as or otherwise support a means for demapping symbols of the received transmission based on the quantity of distance metrics.

Figure 7:
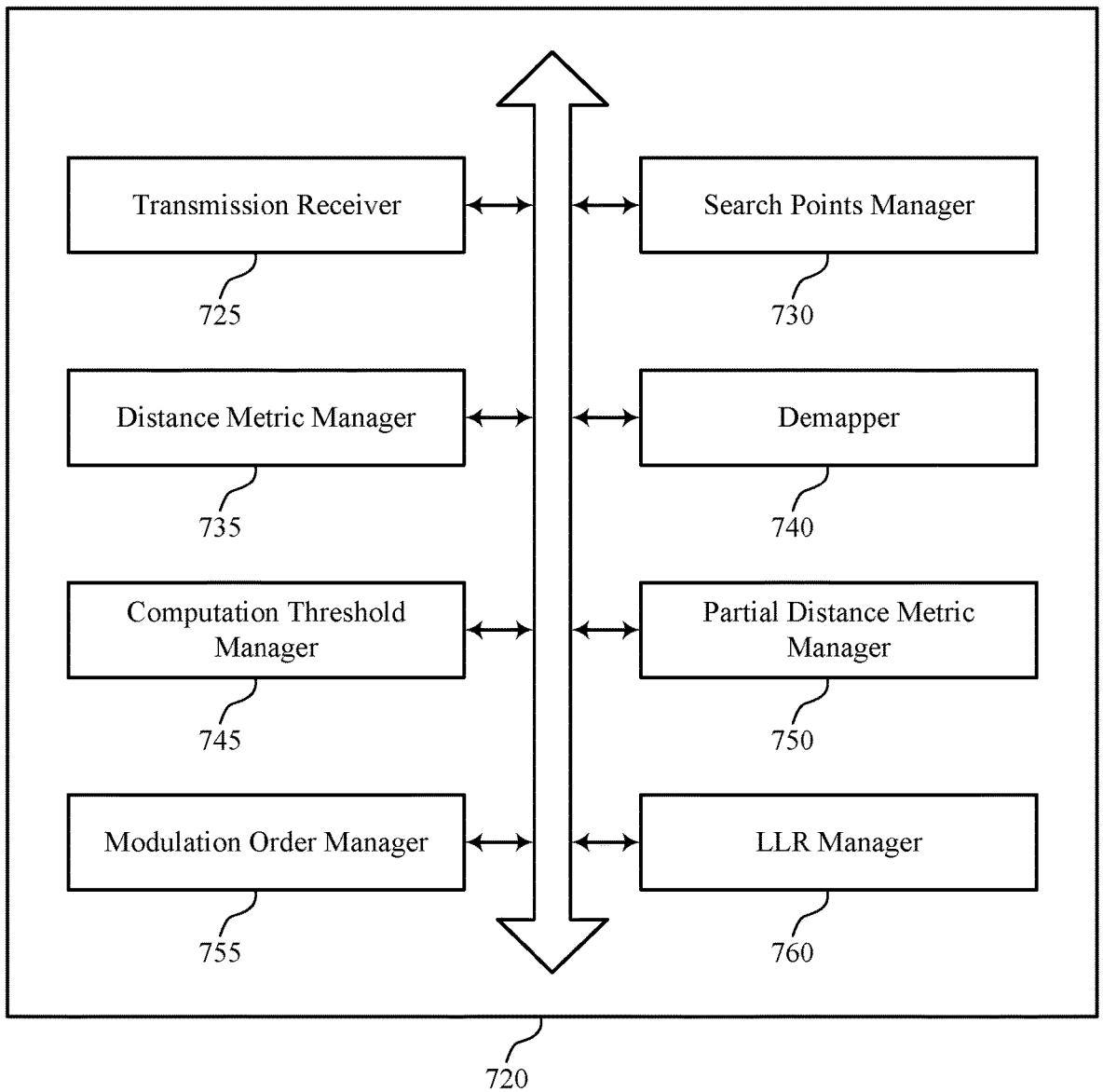
FIG. 7 shows a block diagram of a communications manager that supports enhanced PSRD techniques in accordance with aspects of the present disclosure.

FIG. 7 shows a block diagram 700 of a communications manager 720 that supports enhanced PSRD techniques in accordance with aspects of the present disclosure. The communications manager 720 may be an example of aspects of a communications manager 520, a communications manager 620, or both, as described herein. The communications manager 720, or various components thereof, may be an example of means for performing various aspects of enhanced PSRD techniques as described herein. For example, the communications manager 720 may include a transmission receiver 725, a search points manager 730, a distance metric manager 735, a demapper 740, a computation threshold manager 745, a partial distance metric manager 750, a modulation order manager 755, an LLR manager 760, or any combination thereof. Each of these components may communicate, directly or indirectly, with one another (e.g., via one or more buses).

The communications manager 720 may support wireless communications at a device in accordance with examples as disclosed herein. The transmission receiver 725 may be configured as or otherwise support a means for receiving a transmission including a set of multiple spatial layers. The search points manager 730 may be configured as or otherwise support a means for determining a first number of search points of a first spatial layer of the set of multiple spatial layers based on a modulation order of the first spatial layer. In some examples, the search points manager 730 may be configured as or otherwise support a means for determining a second number of search points of a second spatial layer of the set of multiple spatial layers, the second spatial layer being subsequent to the first spatial layer, where the second number of search points is based on the first number of search points and a modulation order of the second spatial layer. The distance metric manager 735 may be configured as or otherwise support a means for computing a quantity of distance metrics based on the first number of search points and the second number of search points. The demapper 740 may be configured as or otherwise support a means for demapping symbols of the received transmission based on the quantity of distance metrics.

In some examples, to support determining the second number of search points, the search points manager 730 may be configured as or otherwise support a means for calculating a first minimum value from a set of values, the set of values including a first predetermined value divided by the first number of search points and a value corresponding to the modulation order of the second spatial layer, where the second number of search points is equal to the first minimum value. In some examples, the first predetermined value is equal to 64.

In some examples, to support determining the first number of search points, the search points manager 730 may be configured as or otherwise support a means for calculating a second minimum value from a set of values, the set of values including a second predetermined value and a value corresponding to the modulation order of the first spatial layer, where the first number of search points is equal to the second minimum value. In some examples, the second predetermined value is equal to 64.

In some examples, the search points manager 730 may be configured as or otherwise support a means for identifying a third number of search points for a third spatial layer of the set of multiple spatial layers, the third spatial layer being subsequent to the second spatial layer. In some examples, the search points manager 730 may be configured as or otherwise support a means for identifying a fourth number of search points for a fourth spatial layer of the set of multiple spatial layers, the fourth spatial layer being subsequent to the third spatial layer, where the quantity of distance metrics is based on the third number of search points and the fourth number of search points.

In some examples, the third number of search points for the third spatial layer is equal to one and corresponds to a single constellation point for the third spatial layer. In some examples, the fourth number of search points for the fourth spatial layer equal to one and corresponds to a single constellation point for the fourth spatial layer.

In some examples, the computation threshold manager 745 may be configured as or otherwise support a means for determining that the quantity of distance metrics does not satisfy a threshold quantity of distance metric computations supported by the device. In some examples, the computation threshold manager 745 may be configured as or otherwise support a means for modifying the second number of search points such that the quantity of distance metrics satisfies the threshold quantity of distance metric computations. In some examples, the threshold quantity of distance metric computations is based on a hardware configuration of the device.

In some examples, to support computing the quantity of distance metrics, the partial distance metric manager 750 may be configured as or otherwise support a means for calculating, for each search point of the first number of search points, a first set of multiple partial distance metrics associated with the first spatial layer based on the first number of search points and the second number of search points. In some examples, to support computing the quantity of distance metrics, the partial distance metric manager 750 may be configured as or otherwise support a means for calculating, for each search point of the second number of search points, a second set of multiple partial distance metrics associated with the second spatial layer based on the first number of search points and the second number of search points, where the quantity of distance metrics includes the first set of multiple partial distance metrics and the second set of multiple partial distance metrics.

In some examples, the modulation order manager 755 may be configured as or otherwise support a means for identifying a modulation order of each of one or more interference layers associated with the received transmission based on one or more least square estimation metrics. In some examples, the LLR manager 760 may be configured as or otherwise support a means for determining a set of log likelihood values for the first spatial layer based on identifying the modulation order of each of the one or more interference layers.

In some examples, the second number of search points correspond to a set of constellation points associated with the second spatial layer for each search point of the first number of search points.

In some examples, the first number of search points and the second number of search points include inputs for a PSRD process. In some examples, demapping the symbols of the received transmission is based on the PSRD process.

In some examples, the transmission receiver 725 may be configured as or otherwise support a means for receiving a message indicating a configuration of the set of multiple spatial layers and a modulation and coding scheme for the transmission. In some examples, the modulation order manager 755 may be configured as or otherwise support a means for determining one or both of the modulation order of the first spatial layer or the modulation order of the second spatial layer based on the configuration.

Figure 8:
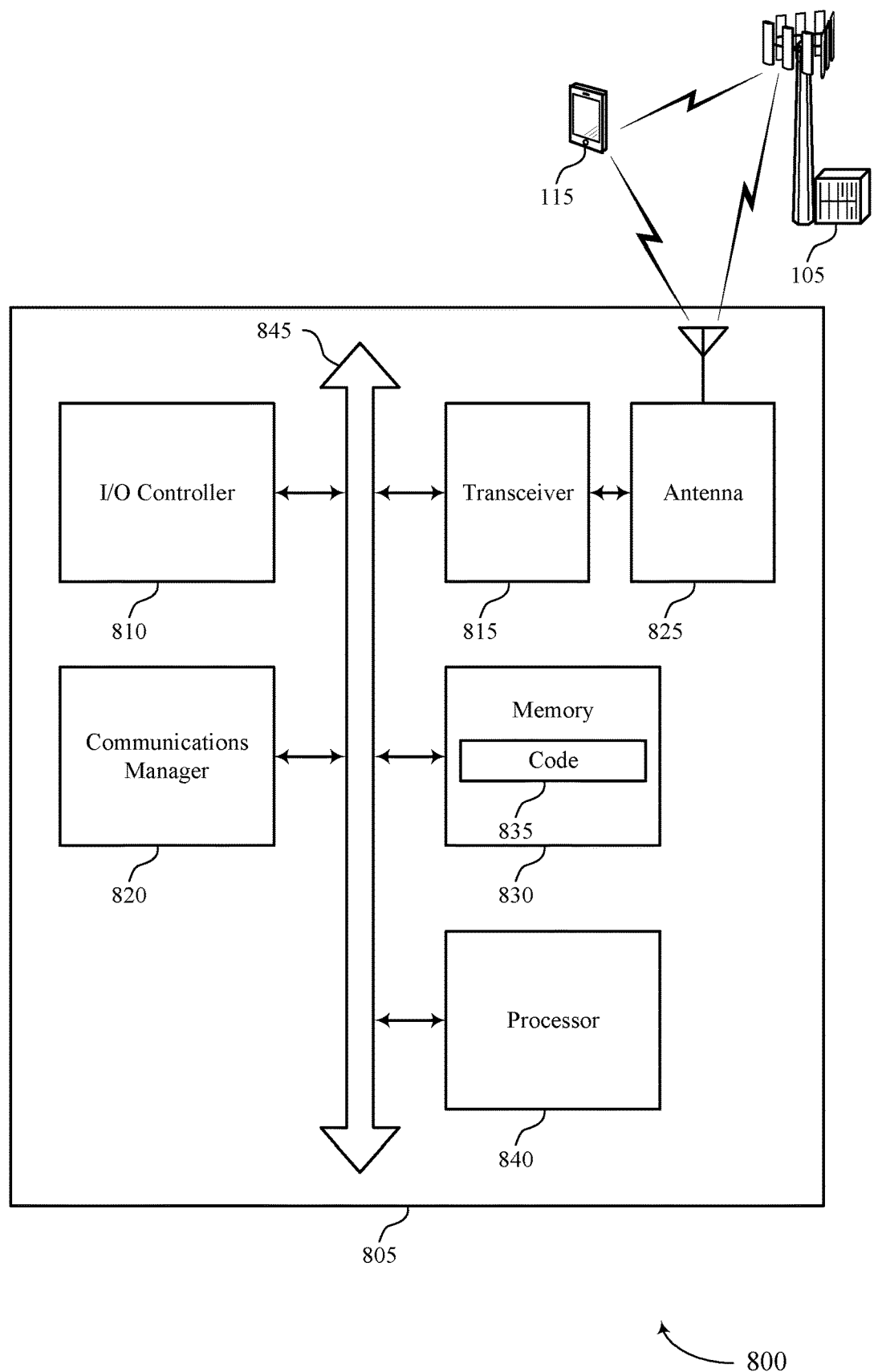
FIG. 8 shows a diagram of a system including a base station that supports enhanced PSRD techniques in accordance with aspects of the present disclosure.

FIG. 8 shows a diagram of a system 800 including a device 805 that supports enhanced PSRD techniques in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting enhanced PSRD techniques). For example, the device 805 or a component of the device 805 may include a processor 840 and memory 830 coupled to the processor 840, the processor 840 and memory 830 configured to perform various functions described herein.

The communications manager 820 may support wireless communications at a device in accordance with examples as disclosed herein. For example, the communications manager 820 may be configured as or otherwise support a means for receiving a transmission including a set of multiple spatial layers. The communications manager 820 may be configured as or otherwise support a means for determining a first number of search points of a first spatial layer of the set of multiple spatial layers based on a modulation order of the first spatial layer. The communications manager 820 may be configured as or otherwise support a means for determining a second number of search points of a second spatial layer of the set of multiple spatial layers, the second spatial layer being subsequent to the first spatial layer, where the second number of search points is based on the first number of search points and a modulation order of the second spatial layer. The communications manager 820 may be configured as or otherwise support a means for computing a quantity of distance metrics based on the first number of search points and the second number of search points. The communications manager 820 may be configured as or otherwise support a means for demapping symbols of the received transmission based on the quantity of distance metrics.

By including or configuring the communications manager 820 in accordance with examples as described herein, the device 805 may support techniques for improved signal processing without increasing hardware complexity. For instance, the device 805 may demap a received multi-layer transmission based on a relatively increased number of search points. As the number of search points increases, the number of corresponding distance metrics computed also increases. Accordingly, the device 805 may process the received transmission with increased efficiency and improved accuracy, which may in turn improve throughput and communications reliability at the device 805 and reduce power consumption at the device 805. Additionally, by increasing throughput and reliability, the device 805 may avoid retransmissions associated with failing to successfully receive a transmission, which may improve efficiency and reduce overall system latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of enhanced PSRD techniques as described herein, or the processor 840 and the memory 830 may be otherwise configured to perform or support such operations.

Figure 9:
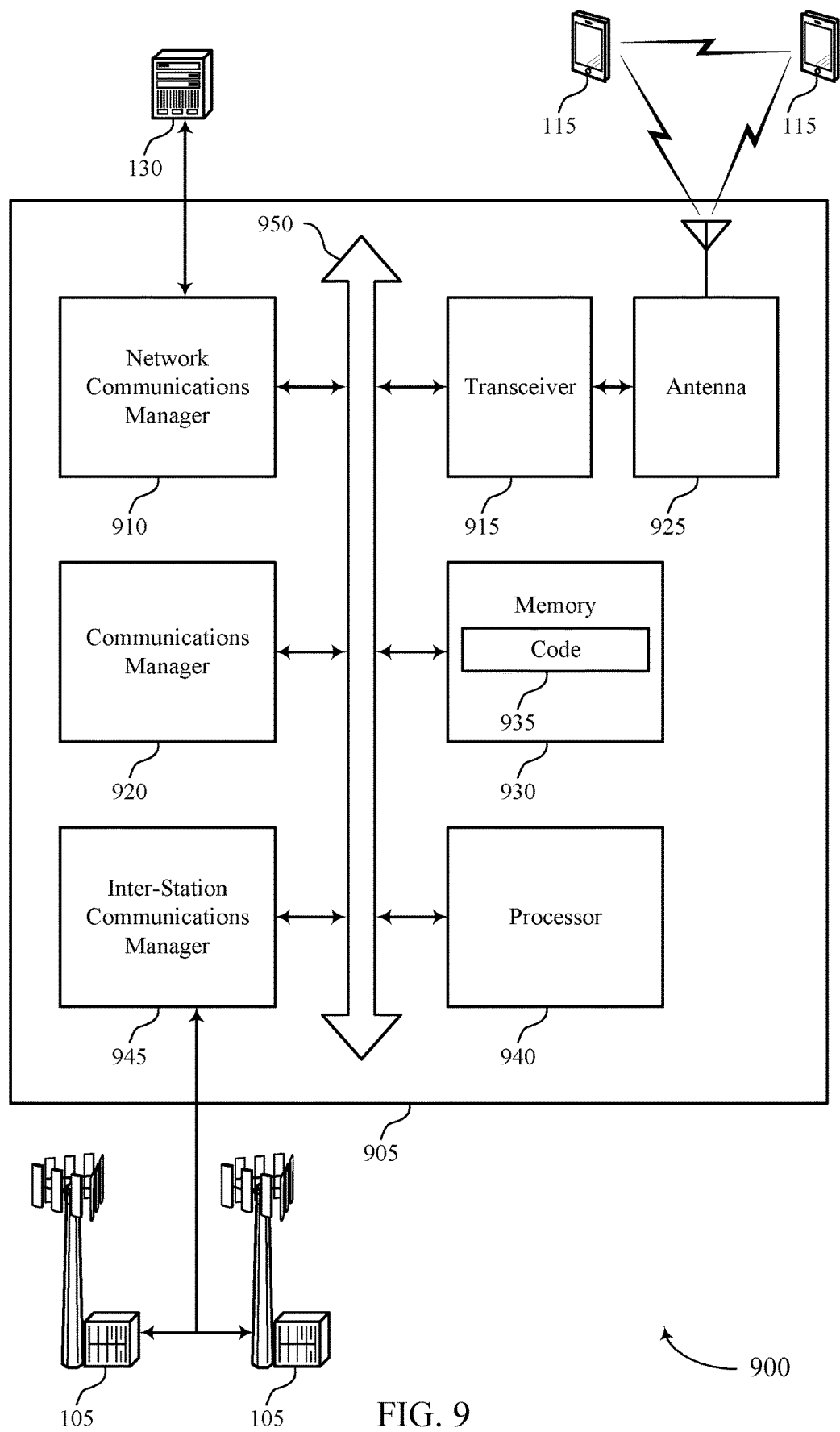
FIG. 9 shows a diagram of a system including a UE that supports enhanced PSRD techniques in accordance with aspects of the present disclosure.

FIG. 9 shows a diagram of a system 900 including a device 905 that supports enhanced PSRD techniques in accordance with aspects of the present disclosure. The device 905 may be an example of or include the components of a device 505, a device 605, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting enhanced PSRD techniques). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communications at a device in accordance with examples as disclosed herein. For example, the communications manager 920 may be configured as or otherwise support a means for receiving a transmission including a set of multiple spatial layers. The communications manager 920 may be configured as or otherwise support a means for determining a first number of search points of a first spatial layer of the set of multiple spatial layers based on a modulation order of the first spatial layer. The communications manager 920 may be configured as or otherwise support a means for determining a second number of search points of a second spatial layer of the set of multiple spatial layers, the second spatial layer being subsequent to the first spatial layer, where the second number of search points is based on the first number of search points and a modulation order of the second spatial layer. The communications manager 920 may be configured as or otherwise support a means for computing a quantity of distance metrics based on the first number of search points and the second number of search points. The communications manager 920 may be configured as or otherwise support a means for demapping symbols of the received transmission based on the quantity of distance metrics.

By including or configuring the communications manager 920 in accordance with examples as described herein, the device 905 may support techniques for improved signal processing without increasing hardware complexity. For instance, the device 905 may demap a received multi-layer transmission based on a relatively increased number of search points. As the number of search points increases, the number of corresponding distance metrics computed also increases. Accordingly, the device 905 may process the received transmission with increased efficiency and improved accuracy, which may in turn improve throughput and communications reliability at the device 905. Additionally, by increasing throughput and reliability, the device 905 may avoid retransmissions associated with failing to successfully receive a transmission, which may improve efficiency and reduce overall system latency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of enhanced PSRD techniques as described herein, or the processor 940 and the memory 930 may be otherwise configured to perform or support such operations.

Figure 10:
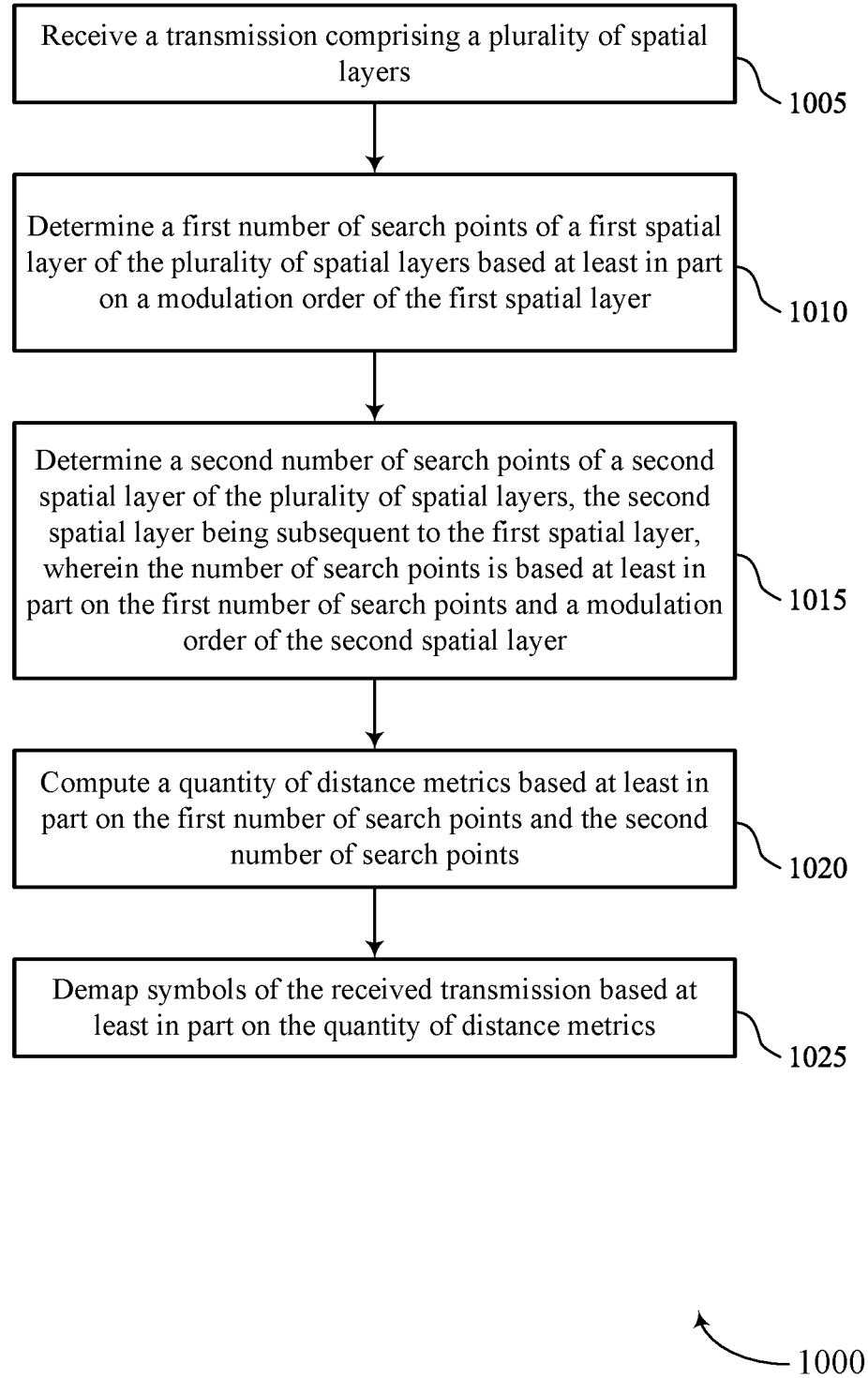
FIGS. 10 and 11 show flowcharts illustrating methods that support enhanced PSRD techniques in accordance with aspects of the present disclosure.

FIG. 10 shows a flowchart illustrating a method 1000 that supports enhanced PSRD techniques in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1005, the method may include receiving a transmission including a set of multiple spatial layers. The operations of 1005 may be performed in accordance with examples as disclosed herein. In some examples, aspects of the operations of 1005 may be performed by a transmission receiver 725 as described with reference to FIG. 7.

At 1010, the method may include determining a first number of search points of a first spatial layer of the set of multiple spatial layers based on a modulation order of the first spatial layer. The operations of 1010 may be performed in accordance with examples as disclosed herein. In some examples, aspects of the operations of 1010 may be performed by a search points manager 730 as described with reference to FIG. 7.

At 1015, the method may include determining a second number of search points of a second spatial layer of the set of multiple spatial layers, the second spatial layer being subsequent to the first spatial layer, where the second number of search points is based on the first number of search points and a modulation order of the second spatial layer. The operations of 1015 may be performed in accordance with examples as disclosed herein. In some examples, aspects of the operations of 1015 may be performed by a search points manager 730 as described with reference to FIG. 7.

At 1020, the method may include computing a quantity of distance metrics based on the first number of search points and the second number of search points. The operations of 1020 may be performed in accordance with examples as disclosed herein. In some examples, aspects of the operations of 1020 may be performed by a distance metric manager 735 as described with reference to FIG. 7.

At 1025, the method may include demapping symbols of the received transmission based on the quantity of distance metrics. The operations of 1025 may be performed in accordance with examples as disclosed herein. In some examples, aspects of the operations of 1025 may be performed by a demapper 740 as described with reference to FIG. 7.

Figure 11:
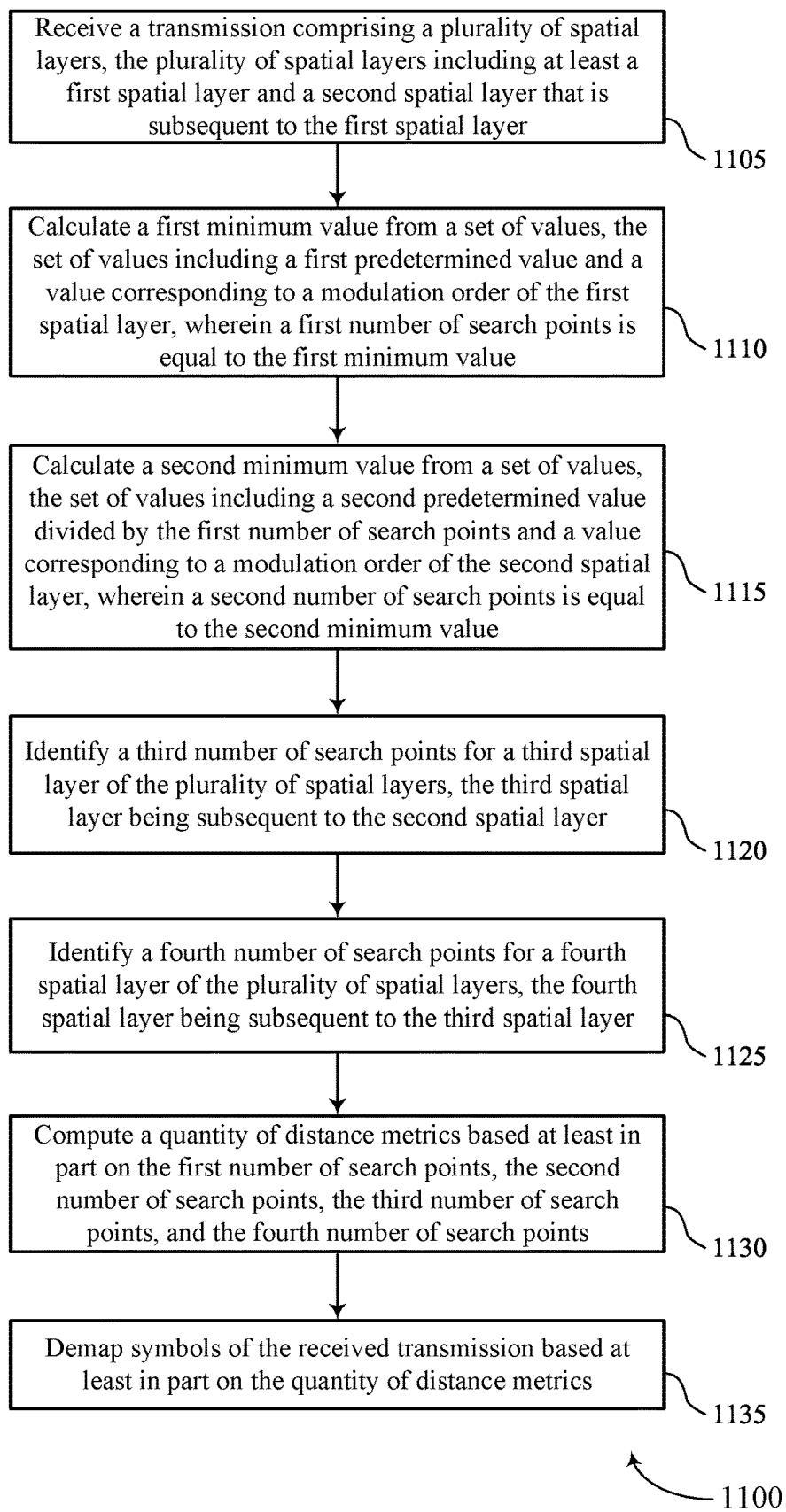

FIG. 11 shows a flowchart illustrating a method 1100 that supports enhanced PSRD techniques in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 9. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include receiving a transmission including a set of multiple spatial layers, the set of multiple spatial layers including at least a first spatial layer and a second spatial layer that is subsequent to the first spatial layer. The operations of 1105 may be performed in accordance with examples as disclosed herein. In some examples, aspects of the operations of 1105 may be performed by a transmission receiver 725 as described with reference to FIG. 7.

At 1110, the method may include calculating a first minimum value from a set of values, the set of values including a first predetermined value and a value corresponding to a modulation order of the first spatial layer, wherein a first number of search points is equal to the first minimum value. The operations of 1110 may be performed in accordance with examples as disclosed herein. In some examples, aspects of the operations of 1110 may be performed by a search points manager 730 as described with reference to FIG. 7.

At 1115, the method may include calculating a second minimum value from a set of values, the set of values including a second predetermined value divided by the first number of search points and a value corresponding to a modulation order of the second spatial layer, wherein a second number of search points is equal to the second minimum value. The operations of 1115 may be performed in accordance with examples as disclosed herein. In some examples, aspects of the operations of 1115 may be performed by a search points manager 730 as described with reference to FIG. 7.

At 1120, the method may include identifying a third number of search points for a third spatial layer of the set of multiple spatial layers, the third spatial layer being subsequent to the second spatial layer. The operations of 1120 may be performed in accordance with examples as disclosed herein. In some examples, aspects of the operations of 1120 may be performed by a search points manager 730 as described with reference to FIG. 7.

At 1125, the method may include identifying a fourth number of search points for a fourth spatial layer of the set of multiple spatial layers, the fourth spatial layer being subsequent to the third spatial layer. The operations of 1125 may be performed in accordance with examples as disclosed herein. In some examples, aspects of the operations of 1125 may be performed by a search points manager 730 as described with reference to FIG. 7.

At 1130, the method may include computing a quantity of distance metrics based on the first number of search points, the second number of search points, the third number of search points, and the fourth number of search points. The operations of 1130 may be performed in accordance with examples as disclosed herein. In some examples, aspects of the operations of 1130 may be performed by a distance metric manager 735 as described with reference to FIG. 7.

At 1135, the method may include demapping symbols of the received transmission based on the quantity of distance metrics. The operations of 1135 may be performed in accordance with examples as disclosed herein. In some examples, aspects of the operations of 1135 may be performed by a demapper 740 as described with reference to FIG. 7.

The following provides an overview of aspects of the present disclosure:

Aspect 1: A method for wireless communications at a device, comprising: receiving a transmission comprising a plurality of spatial layers; determining a first number of search points of a first spatial layer of the plurality of spatial layers based at least in part on a modulation order of the first spatial layer; determining a second number of search points of a second spatial layer of the plurality of spatial layers, the second spatial layer being subsequent to the first spatial layer, wherein the second number of search points is based at least in part on the first number of search points and a modulation order of the second spatial layer; computing a quantity of distance metrics based at least in part on the first number of search points and the second number of search points; and demapping symbols of the received transmission based at least in part on the quantity of distance metrics.

Aspect 2: The method of aspect 1, wherein determining the second number of search points comprises: calculating a first minimum value from a set of values, the set of values including a first predetermined value divided by the first number of search points and a value corresponding to the modulation order of the second spatial layer, wherein the second number of search points is equal to the first minimum value.

Aspect 3: The method of aspect 2, wherein the first predetermined value is equal to 64.

Aspect 4: The method of any of aspects 1 through 3, wherein determining the first number of search points comprises: calculating a second minimum value from a set of values, the set of values including a second predetermined value and a value corresponding to the modulation order of the first spatial layer, wherein the first number of search points is equal to the second minimum value.

Aspect 5: The method of aspect 4, wherein the second predetermined value is equal to 64.

Aspect 6: The method of any of aspects 1 through 5, further comprising: identifying a third number of search points for a third spatial layer of the plurality of spatial layers, the third spatial layer being subsequent to the second spatial layer; and identifying a fourth number of search points for a fourth spatial layer of the plurality of spatial layers, the fourth spatial layer being subsequent to the third spatial layer, wherein the quantity of distance metrics is based at least in part on the third number of search points and the fourth number of search points.

Aspect 7: The method of aspect 6, wherein the third number of search points for the third spatial layer is equal to one and corresponds to a single constellation point for the third spatial layer, and the fourth number of search points for the fourth spatial layer equal to one and corresponds to a single constellation point for the fourth spatial layer.

Aspect 8: The method of any of aspects 1 through 7, further comprising: determining that the quantity of distance metrics does not satisfy a threshold quantity of distance metric computations supported by the device; and modifying the second number of search points such that the quantity of distance metrics satisfies the threshold quantity of distance metric computations.

Aspect 9: The method of aspect 8, wherein the threshold quantity of distance metric computations is based at least in part on a hardware configuration of the device.

Aspect 10: The method of any of aspects 1 through 9, wherein computing the quantity of distance metrics comprises: calculating, for each search point of the first number of search points, a first plurality of partial distance metrics associated with the first spatial layer based at least in part on the first number of search points and the second number of search points; and calculating, for each search point of the second number of search points, a second plurality of partial distance metrics associated with the second spatial layer based at least in part on the first number of search points and the second number of search points, wherein the quantity of distance metrics comprises the first plurality of partial distance metrics and the second plurality of partial distance metrics.

Aspect 11: The method of any of aspects 1 through 10, further comprising: identifying a modulation order of each of one or more interference layers associated with the received transmission based at least in part on one or more least square estimation metrics; and determining a set of log likelihood values for the first spatial layer based at least in part on identifying the modulation order of each of the one or more interference layers.

Aspect 12: The method of any of aspects 1 through 11, wherein the second number of search points correspond to a set of constellation points associated with the second spatial layer for each search point of the first number of search points.

Aspect 13: The method of any of aspects 1 through 12, wherein the first number of search points and the second number of search points comprise inputs for a PSRD process, demapping the symbols of the received transmission is based at least in part on the PSRD process.

Aspect 14: The method of any of aspects 1 through 13, further comprising: receiving a message indicating a configuration of the plurality of spatial layers and an MCS for the transmission; and determining one or both of the modulation order of the first spatial layer or the modulation order of the second spatial layer based at least in part on the configuration.

Aspect 15: An apparatus for wireless communications at a device, comprising a memory and a processor coupled to the memory, the processor configured to cause the apparatus to perform a method of any of aspects 1 through 14.

Aspect 16: An apparatus for wireless communications at a device, comprising at least one means for performing a method of any of aspects 1 through 14.

Aspect 17: A non-transitory computer-readable medium storing code for wireless communications at a device, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a device, comprising:
   a memory; and
   a processor coupled to the memory and configured to cause the apparatus to:
   receive a transmission comprising a plurality of spatial layers;
   determine a first number of search points of a first spatial layer of the plurality of spatial layers based at least in part on a modulation order of the first spatial layer;
   determine a second number of search points of a second spatial layer of the plurality of spatial layers, the second spatial layer being subsequent to the first spatial layer, wherein the second number of search points is based at least in part on the first number of search points and a modulation order of the second spatial layer;
   compute a quantity of distance metrics based at least in part on the first number of search points and the second number of search points; and
   demap symbols of the received transmission based at least in part on the quantity of distance metrics.

2. The apparatus of claim 1, wherein the processor is further configured to cause the apparatus to:
   calculate a first minimum value from a set of values, the set of values including a first predetermined value divided by the first number of search points and a value corresponding to the modulation order of the second spatial layer, wherein the second number of search points is equal to the first minimum value.

3. The apparatus of claim 2, wherein the first predetermined value is equal to 64.

4. The apparatus of claim 1, wherein the processor is further configured to cause the apparatus to:
   calculate a second minimum value from a set of values, the set of values including a second predetermined value and a value corresponding to the modulation order of the first spatial layer, wherein the first number of search points is equal to the second minimum value.

5. The apparatus of claim 4, wherein the second predetermined value is equal to 64.

6. The apparatus of claim 1, wherein the processor is further configured to cause the apparatus to:
   identify a third number of search points for a third spatial layer of the plurality of spatial layers, the third spatial layer being subsequent to the second spatial layer; and
   identify a fourth number of search points for a fourth spatial layer of the plurality of spatial layers, the fourth spatial layer being subsequent to the third spatial layer, wherein the quantity of distance metrics is based at least in part on the third number of search points and the fourth number of search points.

7. The apparatus of claim 6, wherein:
   the third number of search points for the third spatial layer is equal to one and corresponds to a single constellation point for the third spatial layer, and
   the fourth number of search points for the fourth spatial layer equal to one and corresponds to a single constellation point for the fourth spatial layer.

8. The apparatus of claim 1, wherein the processor is further configured to cause the apparatus to:
   determine that the quantity of distance metrics does not satisfy a threshold quantity of distance metric computations supported by the device; and
   modify the second number of search points such that the quantity of distance metrics satisfies the threshold quantity of distance metric computations.

9. The apparatus of claim 8, wherein the threshold quantity of distance metric computations is based at least in part on a hardware configuration of the device.

10. The apparatus of claim 1, wherein the processor is further configured to cause the apparatus to:
    calculate, for each search point of the first number of search points, a first plurality of partial distance metrics associated with the first spatial layer based at least in part on the first number of search points and the second number of search points; and
    calculate, for each search point of the second number of search points, a second plurality of partial distance metrics associated with the second spatial layer based at least in part on the first number of search points and the second number of search points, wherein the quantity of distance metrics comprises the first plurality of partial distance metrics and the second plurality of partial distance metrics.

11. The apparatus of claim 1, wherein the processor is further configured to cause the apparatus to:
    identify a modulation order of each of one or more interference layers associated with the received transmission based at least in part on one or more least square estimation metrics; and
    determine a set of log likelihood values for the first spatial layer based at least in part on identifying the modulation order of each of the one or more interference layers.

12. The apparatus of claim 1, wherein the second number of search points correspond to a set of constellation points associated with the second spatial layer for each search point of the first number of search points.

13. The apparatus of claim 1, wherein:
    the first number of search points and the second number of search points comprise inputs for a per-stream recursive demapping process, and demapping the symbols of the received transmission is based at least in part on the per-stream recursive demapping process.

14. The apparatus of claim 1, wherein the processor is further configured to cause the apparatus to:
receive a message indicating a configuration of the plurality of spatial layers and a modulation and coding scheme for the transmission; and
determine one or both of the modulation order of the first spatial layer or the modulation order of the second spatial layer based at least in part on the configuration.

15. A method for wireless communications at a device, comprising:
receiving a transmission comprising a plurality of spatial layers;
determining a first number of search points of a first spatial layer of the plurality of spatial layers based at least in part on a modulation order of the first spatial layer;
determining a second number of search points of a second spatial layer of the plurality of spatial layers, the second spatial layer being subsequent to the first spatial layer, wherein the second number of search points is based at least in part on the first number of search points and a modulation order of the second spatial layer;
computing a quantity of distance metrics based at least in part on the first number of search points and the second number of search points; and
demapping symbols of the received transmission based at least in part on the quantity of distance metrics.

16. The method of claim 15, wherein determining the second number of search points comprises:
calculating a first minimum value from a set of values, the set of values including a first predetermined value divided by the first number of search points and a value corresponding to the modulation order of the second spatial layer, wherein the second number of search points is equal to the first minimum value.

17. The method of claim 16, wherein the first predetermined value is equal to 64.

18. The method of claim 15, wherein determining the first number of search points comprises:
calculating a second minimum value from a set of values, the set of values including a second predetermined value and a value corresponding to the modulation order of the first spatial layer, wherein the first number of search points is equal to the second minimum value.

19. The method of claim 18, wherein the second predetermined value is equal to 64.

20. The method of claim 15, further comprising:
identifying a third number of search points for a third spatial layer of the plurality of spatial layers, the third spatial layer being subsequent to the second spatial layer; and
identifying a fourth number of search points for a fourth spatial layer of the plurality of spatial layers, the fourth spatial layer being subsequent to the third spatial layer, wherein the quantity of distance metrics is based at least in part on the third number of search points and the fourth number of search points.

21. The method of claim 20, wherein
the third number of search points for the third spatial layer is equal to one and corresponds to a single constellation point for the third spatial layer, and
the fourth number of search points for the fourth spatial layer equal to one and corresponds to a single constellation point for the fourth spatial layer.

22. The method of claim 15, further comprising:
determining that the quantity of distance metrics does not satisfy a threshold quantity of distance metric computations supported by the device; and
modifying the second number of search points such that the quantity of distance metrics satisfies the threshold quantity of distance metric computations.

23. The method of claim 22, wherein the threshold quantity of distance metric computations is based at least in part on a hardware configuration of the device.

24. The method of claim 15, wherein computing the quantity of distance metrics comprises:
calculating, for each search point of the first number of search points, a first plurality of partial distance metrics associated with the first spatial layer based at least in part on the first number of search points and the second number of search points; and
calculating, for each search point of the second number of search points, a second plurality of partial distance metrics associated with the second spatial layer based at least in part on the first number of search points and the second number of search points, wherein the quantity of distance metrics comprises the first plurality of partial distance metrics and the second plurality of partial distance metrics.

25. The method of claim 15, further comprising:
identifying a modulation order of each of one or more interference layers associated with the received transmission based at least in part on one or more least square estimation metrics; and
determining a set of log likelihood values for the first spatial layer based at least in part on identifying the modulation order of each of the one or more interference layers.

26. The method of claim 15, wherein the second number of search points correspond to a set of constellation points associated with the second spatial layer for each search point of the first number of search points.

27. The method of claim 15, wherein
the first number of search points and the second number of search points comprise inputs for a per-stream recursive demapping process, and
demapping the symbols of the received transmission is based at least in part on the per-stream recursive demapping process.

28. The method of claim 15, further comprising:
receiving a message indicating a configuration of the plurality of spatial layers and a modulation and coding scheme for the transmission; and
determining one or both of the modulation order of the first spatial layer or the modulation order of the second spatial layer based at least in part on the configuration.

29. An apparatus for wireless communications at a device, comprising:
means for receiving a transmission comprising a plurality of spatial layers;
means for determining a first number of search points of a first spatial layer of the plurality of spatial layers based at least in part on a modulation order of the first spatial layer;
means for determining a second number of search points of a second spatial layer of the plurality of spatial layers, the second spatial layer being subsequent to the first spatial layer, wherein the second number of search points is based at least in part on the first number of search points and a modulation order of the second spatial layer;

means for computing a quantity of distance metrics based at least in part on the first number of search points and the second number of search points; and means for demapping symbols of the received transmission based at least in part on the quantity of distance metrics.

30. A non-transitory computer-readable medium storing code for wireless communications at a device, the code comprising instructions executable by a processor to:

receive a transmission comprising a plurality of spatial layers;

determine a first number of search points of a first spatial layer of the plurality of spatial layers based at least in part on a modulation order of the first spatial layer;

determine a second number of search points of a second spatial layer of the plurality of spatial layers, the second spatial layer being subsequent to the first spatial layer, wherein the second number of search points is based at least in part on the first number of search points and a modulation order of the second spatial layer;

compute a quantity of distance metrics based at least in part on the first number of search points and the second number of search points; and demap symbols of the received transmission based at least in part on the quantity of distance metrics.

* * * * *